(12) United States Patent
Kim et al.

(10) Patent No.: US 8,810,606 B2
(45) Date of Patent: Aug. 19, 2014

(54) DISPLAY DEVICE AND DRIVING METHOD THEREOF

(75) Inventors: Sang-Soo Kim, Seoul (KR); Dong-Gyu Kim, Yongin-si (KR); Seung-Hwan Moon, Yongin-si (KR); Seung-Woo Lee, Seoul (KR); Seung-Soo Baek, Seoul (KR)

(73) Assignee: Samsung Display Co., Ltd. (KR)

( * ) Notice: Subject to any disclaimer, the term of this patent is extended or adjusted under 35 U.S.C. 154(b) by 1465 days.

(21) Appl. No.: 11/273,190

(22) Filed: Nov. 14, 2005

(65) Prior Publication Data

US 2006/0208984 A1 Sep. 21, 2006

(30) Foreign Application Priority Data

Nov. 12, 2004 (KR) .................. 10-2004-0092607
Nov. 26, 2004 (KR) .................. 10-2004-0098028
Jan. 11, 2005 (KR) .................. 10-2005-0002543
Jan. 18, 2005 (KR) .................. 10-2005-0004526

(51) Int. Cl.
*G09G 5/10* (2006.01)

(52) U.S. Cl.
USPC ............. 345/690; 345/89; 345/98; 345/99; 345/100

(58) Field of Classification Search
USPC ........... 345/89, 92, 98, 690, 695, 99, 100, 30, 345/39, 77, 82, 102, 204, 208; 349/39, 146
See application file for complete search history.

(56) References Cited

U.S. PATENT DOCUMENTS

| | | | |
|---|---|---|---|
| 5,283,566 A * | 2/1994 | Mimura et al. | 345/211 |
| 6,078,367 A | 6/2000 | Satou | |
| 6,104,450 A * | 8/2000 | Hiraishi | 349/48 |
| 6,781,605 B2 * | 8/2004 | Kudo et al. | 345/690 |
| 6,856,373 B2 * | 2/2005 | Sekido et al. | 349/181 |
| 7,262,756 B2 * | 8/2007 | Nakagawa et al. | 345/89 |
| 7,446,747 B2 * | 11/2008 | Youngblood et al. | 345/100 |
| 8,456,405 B2 * | 6/2013 | Oohira | 345/99 |

(Continued)

FOREIGN PATENT DOCUMENTS

| | | |
|---|---|---|
| CN | 1099177 | 2/1995 |
| CN | 1293802 | 5/2001 |

(Continued)

OTHER PUBLICATIONS

This instant IDS form is Part 2 of 2 filed on Sep. 10, 2007.

(Continued)

*Primary Examiner* — Dwayne Bost
*Assistant Examiner* — Robert Michaud
(74) *Attorney, Agent, or Firm* — Cantor Colburn LLP

(57) ABSTRACT

A display device according to an embodiment of the present invention includes: a pixel including a first subpixel and a second subpixel; a first signal line connected to the first subpixel and transmitting a first signal; a second signal line connected to the second subpixel and transmitting a second signal; a third signal line intersecting the first and the second signal lines, connected to at least one of the first and the second subpixels, and transmitting a third signal; and a fourth signal line intersecting the first and the second signal lines and transmitting a fourth signal, wherein the first subpixel and the second subpixel are supplied with data voltages having different magnitude, and the data voltages applied to the first and the second subpixels are originated from a single image information.

36 Claims, 40 Drawing Sheets

(56) References Cited

U.S. PATENT DOCUMENTS

| | | | |
|---|---|---|---|
| 2001/0030635 A1 | 10/2001 | Kodate et al. | |
| 2002/0047822 A1* | 4/2002 | Senda et al. | 345/90 |
| 2002/0050971 A1* | 5/2002 | Su et al. | 345/92 |
| 2002/0089813 A1* | 7/2002 | Yamamoto et al. | 361/328 |
| 2002/0149598 A1 | 10/2002 | Greier et al. | |
| 2003/0043100 A1 | 3/2003 | Moon | |
| 2003/0222840 A1* | 12/2003 | Koga et al. | 345/89 |
| 2004/0051835 A1 | 3/2004 | Hsieh et al. | |
| 2007/0177067 A1* | 8/2007 | Kim et al. | 349/43 |

FOREIGN PATENT DOCUMENTS

| | | |
|---|---|---|
| JP | 57037981 | 3/1982 |
| JP | 03153296 | 7/1991 |
| JP | 04097126 | 3/1992 |
| JP | 04318512 | 11/1992 |
| JP | 05072554 | 3/1993 |
| JP | 08146383 A | 6/1996 |
| JP | 08179341 | 7/1996 |
| JP | 10142577 | 5/1998 |
| JP | 10197894 | 7/1998 |
| JP | 10274783 | 10/1998 |
| JP | 2000019559 | 1/2000 |
| JP | 2000122080 | 4/2000 |
| JP | 2000-235371 A | 8/2000 |
| JP | 2000338918 | 12/2000 |
| JP | 2001109018 | 4/2001 |
| JP | 2003050566 | 2/2003 |
| JP | 2003186451 | 7/2003 |
| JP | 2003255907 A | 9/2003 |
| JP | 2003295160 | 10/2003 |
| JP | 2003308048 | 10/2003 |
| JP | 2004062146 | 2/2004 |
| JP | 2004117532 | 4/2004 |
| JP | 2005189804 | 7/2005 |
| KR | 1998019206 | 5/1998 |
| KR | 1019990052286 | 7/1999 |
| KR | 1020020034851 | 5/2002 |
| KR | 1020030008044 | 1/2003 |
| KR | 1020030012668 | 2/2003 |
| KR | 1020030042221 | 5/2003 |
| KR | 1020030065817 | 8/2003 |
| KR | 1020030078786 | 10/2003 |
| KR | 1020030095260 | 12/2003 |
| KR | 1020040020318 | 3/2004 |
| KR | 1020040021893 A | 3/2004 |
| KR | 1020040027214 | 4/2004 |
| KR | 1020040051979 | 6/2004 |
| KR | 1020040057249 | 7/2004 |
| KR | 1020040060594 | 7/2004 |
| KR | 1020040084019 | 10/2004 |
| TW | 573192 | 1/2004 |
| TW | 588314 | 5/2004 |
| WO | 2004086129 A1 | 10/2004 |
| WO | 2004090622 A1 | 10/2004 |

OTHER PUBLICATIONS

This instant IDS form is Part 1 of 2 filed on Sep. 10, 2007.

* cited by examiner

FIG.17B

DISPLAY DEVICE AND DRIVING METHOD THEREOF

BACKGROUND OF THE INVENTION (a) Field of the Invention

The present invention relates to a display device and a driving method thereof, and in particular, to a liquid crystal display.

(b) Description of Related Art

Generally, a liquid crystal display (LCD) includes a pair of panels including a plurality of pixel electrodes and a common electrode and a liquid crystal (LC) layer interposed between the panels and having dielectric anisotropy. The pixel electrodes are arranged in a matrix and connected to switching elements such as thin film transistors (TFTs). The pixel electrodes are supplied with data voltages through the TFTs row by row. The common electrode ranges over an entire surface of a panel and is supplied with a common electrode. The pixel electrode and the common electrode along with the LC layer disposed therebetween form LC capacitors in circuital view, and a LC capacitor as well as a switching element is a basic element forming a pixel.

The LCD generates electric field in the LC layer by applying voltages to the electrodes, and obtains desired images by controlling the strength of the electric field to varying the transmittance of light incident on the LC layer.

Among the LCDs, a vertical alignment (VA) mode LCD, which aligns LC molecules such that the long axes of the LC molecules are perpendicular to the panels in absence of electric field, is spotlighted because of its high contrast ratio and wide reference viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the VA mode LCD has poor lateral visibility as compared with front visibility. For example, a lateral gamma curve is different from a front gamma curve.

To improve the lateral visibility, a pixel is divided into two subpixels capacitively coupled to each other. One of the two subpixels is directly supplied with a voltage, while the other is subjected to voltage drop by the capacitive coupling such that the two subpixels have different voltages to cause different transmittances.

However, the conventional method may not control the transmittances of the two subpixels. In particular, since the transmittance is varied depending on the color of light, it is preferred that the voltages for different colors are different, but it may not be possible. Furthermore, the aperture ratio is reduced due to the addition of conductors for capacitive coupling, and the transmittance is reduced due to the voltage drop caused by the capacitive coupling.

In the meantime, the polarity of the data voltages relative to a common voltage is inverted every frame, every predetermined number of row or columns, or every pixel for preventing disadvantages including degradation caused by a long-time application of a unidirectional electric field. Among the inversion schemes of the data voltages, a column inversion, which reverses the polarity of the data lines every predetermined number of pixel columns, keeps the polarity of the data voltages applied to a data line for a predetermined time to reduce the signal delay of the data lines and to reduce the power consumption.

However, the column inversion may cause vertical flickering and vertical crosstalk to degrade the image quality of the LCD.

SUMMARY OF THE INVENTION

A display device according to an embodiment of the present invention includes: a pixel including a first subpixel and a second subpixel; a first signal line connected to the first subpixel and transmitting a first signal; a second signal line connected to the second subpixel and transmitting a second signal; a third signal line intersecting the first and the second signal lines, connected to at least one of the first and the second subpixels, and transmitting a third signal; and a fourth signal line intersecting the first and the second signal lines and transmitting a fourth signal, wherein the first subpixel and the second subpixel are supplied with data voltages having different magnitude, and the data voltages applied to the first and the second subpixels are originated from a single image information.

The first subpixel may include a first switching element connected to the first signal line and a first liquid crystal capacitor connected to the first switching element, and the second subpixel may include a second switching element connected to the second signal line and a second liquid crystal capacitor connected to the second switching element.

The first liquid crystal capacitor may include a first subpixel electrode connected to the first switching element, and the second liquid crystal capacitor may include a second subpixel electrode connected to the second switching element.

The first and the second subpixel electrodes may be spaced from each other by a gap making oblique angles with the first to the fourth signal lines.

At least one of the first and the second subpixel electrodes may have a cutout making oblique angles with the first to the fourth signal lines.

The first and the second subpixel may further include a common electrode having a cutout making oblique angles with the first to the fourth signal lines.

The first switching element may be connected to the first and the third signal lines, and the second switching element may be connected to the second and the third signal lines.

The first switching element may be turned on according to the first signal and transmits the third signal, and the second switching element may be turned on according to the second signal and transmits the third signal.

The first switching element may be turned on according to the third signal and transmits the first signal, and the second switching element may be turned on according to the third signal and transmits the second signal.

The first subpixel may be connected to the first and the third signal lines and the second subpixel may be connected to the second and the fourth signal.

The first subpixel may further include a first storage capacitor connected to the first switching element, and the second subpixel may further include a second storage capacitor connected to the second switching element.

First and second gray voltage groups that are different from each other may be generated, the first subpixel electrode may be supplied with a voltage selected from the first gray voltage group, and the second subpixel electrode may be supplied with a voltage selected from the second gray voltage group.

The image information may be processed to generate first and second image signals, and the first and the second subpixel electrodes may be supplied with voltages selected from a single gray voltage group corresponding to the first and the second image signals.

The first subpixel and the second subpixel may be capacitively coupled to each other.

A liquid crystal display according to an embodiment of the present invention includes: a pixel including a first subpixel and a second subpixel; a gate line coupled to the first and the second subpixels and transmitting a gate signal; a first data line intersecting the gate line, coupled to the first subpixel, and transmitting the first data voltage; and a second data line intersecting the gate line, coupled to the second subpixel, and transmitting the second data voltage.

The first data voltage may be different from the second data voltage and the first and the second data voltages may be obtained from a single image information.

The first data voltage may have a polarity opposite to a polarity of the second data voltage.

The polarity of the first data voltage may be kept constant for a predetermined time.

A display device according to another embodiment of the present invention includes: a plurality of pixels arranged in a matrix, each pixel including a first subpixel and a second subpixel; a plurality of first gate lines connected to the first subpixels and transmitting first gate-on voltages; a plurality of second gate lines connected to the second subpixels and transmitting second gate-on voltages; a plurality of data lines intersecting the first and the second gate lines, connected to the first and the second subpixels, and transmitting data voltages; a gray signal generating circuit generating a first gray signal group and a second gray signal group; a selection circuit alternately selecting and outputting the first and the second signal groups; a data driver generating data voltages corresponding to image data based on the first and the second gray signal groups and applying the data voltages to the data lines; and a gate driver sequentially applying the first and the second gate-on voltages to the first and the second gate lines.

The gray signals may include analog gray voltages.

The selection circuit may include an analog switch or an analog multiplexer. The selection circuit may be integrated into the data driver. The gray signal generation circuit may include a plurality of analog voltage generation circuit, each analog voltage generation circuit including a series of resistors.

The gray signals may include digital gray data.

The display device may further include a digital-to-analog voltage converter converting the digital gray data in the gray signal groups selected by the selection circuit to generate a plurality of gray voltages.

The selection circuit may include a plurality of multiplexers connected to the gray signal generating circuit.

The application of the first gate-on voltage and the application of the second gate-on voltage may overlap each other at least in part.

A duration of the first gate-on voltage may be equal to or shorter than a duration of the second gate-on voltage.

A liquid crystal display according to another embodiment of the present invention includes: a plurality of pixels arranged in a matrix, each pixel including a first subpixel and a second subpixel; a plurality of first gate lines connected to the first subpixels and transmitting first gate-on voltages; a plurality of second gate lines connected to the second subpixels and transmitting second gate-on voltages; a plurality of data lines intersecting the first and the second gate lines, connected to the first and the second subpixels, and transmitting data voltages; a reference voltage generating circuit generating a plurality of reference voltages that have periodically changing magnitude; a gray voltage generating circuit generating a plurality of gray voltages based on the reference voltages; a data driver selecting data voltages corresponding to image data from the gray voltages and applying the data voltages to the data lines; and a gate driver sequentially applying the first and the second gate-on voltages to the first and the second gate lines.

A liquid crystal display according to another embodiment of the present invention includes: first and second gate lines extending substantially parallel to each other and separated from each other; a data line intersecting the first and the second gate lines; a first thin film transistor connected to the first gate line and the second data line; a second thin film transistor connected to the second gate line and the second data line; a first display electrode connected to the first thin film transistor; and a second display electrode connected to the second thin film transistor, wherein the first and the second display electrodes have oblique edges facing each other.

A liquid crystal display according to another embodiment of the present invention includes: first and second gate lines extending in a first direction and separated from each other; a data line intersecting the first and the second gate lines; a first thin film transistor connected to the first gate line and the second data line; a second thin film transistor connected to the second gate line and the second data line; a first display electrode connected to the first thin film transistor; and a second display electrode connected to the second thin film transistor, wherein the first display electrode is longer than the second display electrode in the second direction, and the first display electrode is disposed within a second-directional length of the second display electrode.

A liquid crystal display according to another embodiment of the present invention includes: first and second gate lines extending in a first direction and separated from each other; a data line intersecting the first and the second gate lines; a first thin film transistor connected to the first gate line and the second data line; a second thin film transistor connected to the second gate line and the second data line; a first display electrode connected to the first thin film transistor; and a second display electrode connected to the second thin film transistor, wherein each of the first and the second display electrodes substantially has a symmetry with respect to a straight line extending in the first direction.

The liquid crystal display may further include a third display electrode facing the first and the second display electrodes.

At least one of the first and the second display electrodes may have a cutout.

The third display electrode may have a cutout or protrusion.

At least one of the first and the second display electrodes and the third display electrode may have alternately arranged cutouts.

A gap between the first and the second display electrodes and a cutout of the third display electrode may be alternately arranged.

The liquid crystal display may further include a storage electrode line overlapping the first and the second display electrodes.

Each of the first and the second thin film transistors may have a gate electrode connected to the first or the second gate line, a source electrode connected to the data line, and a drain electrode connected to the first or the second display electrode.

A voltage of the first display electrode may be different from a voltage of the second display electrode.

A voltage of the first display electrode subtracted by a predetermined voltage may be smaller that a voltage of the second display electrode by the predetermined voltage.

The liquid crystal display may further include a shielding electrode overlapping the data line and disposed on a layer as the first and the second display pixel electrodes.

A thin film transistor array panel according to an embodiment of the present invention includes: a gate line formed on a substrate; first and second data lines insulated from the gate line and intersecting the gate line; a first thin film transistor connected to the gate line and the first drain electrode and including a first drain electrode; a second thin film transistor connected to the gate line and the second drain electrode and including a second drain electrode; a passivation layer formed on the gate line, the first and the second data lines, and the first and the second thin film transistors, and having a first contact hole exposing the first data line and a second contact hole exposing the second data line; and a pixel electrode including a first subpixel electrode connected to the first drain electrode through the first contact hole and a second subpixel electrode connected to the second drain electrode through the second contact hole.

The thin film transistor array panel may further include a shielding electrode insulated from the first and the second subpixel electrodes and overlapping at least one of the gate line and the first and the second data lines.

The pixel electrode and the shielding electrode may be disposed on the passivation layer.

The thin film transistor array panel may further include a storage electrode line including a storage electrode overlapping the first and the second drain electrodes to form storage capacitances.

The shielding electrode and the storage electrode may be supplied with a single voltage.

The shielding electrode may fully cover the first and the second data lines.

The first subpixel electrode may have an area different from an area of the second subpixel electrode.

A method of driving a liquid crystal display including a plurality of pixels, each pixel including a plurality of subpixels, according to an embodiment of the present invention includes: receiving an input image data; converting the image data into at least two data voltages; and applying the at least two data voltages to the subpixels.

The conversion may include: generating at least two groups of gray voltages; and selecting gray voltages corresponding to the input image data from the at least two groups of gray voltages to generate data voltages.

The conversion may include: converting the input image data into at least two output image data; and selecting gray voltages corresponding to the at least two output image data from a group of gray voltages to generate data voltages.

A method of driving a liquid crystal display including a plurality of pixels arranged in a matrix, each pixel including first and second subpixels, according to another embodiment of the present invention includes: applying a first data voltage having a first polarity to the first subpixel; and applying a second data voltage having a second polarity opposite to the first polarity to the second subpixel.

The first and the second data voltages may be generated from a single image data.

The first subpixels of adjacent pixels in a row may have opposite polarities, and the second subpixels of adjacent pixels in a row may have opposite polarities.

The first subpixels of adjacent pixels in a column may have the same polarity, and the second subpixels of adjacent pixels in a column may have the same polarity.

Each of the data voltages may be simultaneously supplied with at least two subpixels.

A method of driving a liquid crystal display including a plurality of pixels, each pixel including a first subpixel and a second subpixel, according to another embodiment of the present invention includes: transmitting image data; outputting a first group of gray voltages; converting the image data into first data voltages selected from the first group of gray voltages; applying the first data voltages to the first subpixels; outputting a second group of gray voltages having magnitudes different from the first group of gray voltages by substituting the first group of gray voltages with the second group of gray voltages using a multiplexer; converting the image data into second data voltages selected from the second group of gray voltages; and applying the second data voltages to the second subpixels.

The method may further include: generating the first and the second groups of gray voltages, wherein the output of a first group of gray voltages comprises: selecting the first group of gray voltages by using the multiplexer, and wherein the output of a second group of gray voltages comprises: selecting the second group of gray voltages by using the multiplexer.

The method may further include: storing first and second groups of digital gray data, wherein the output of a first group of gray voltages comprises: selecting the first group of digital gray data by using the multiplexer; and analog-converting the first groups of digital gray data into the first group of gray voltages, and wherein the output of a second group of gray voltages comprises: selecting the second group of digital gray data by using the multiplexer; and analog-converting the second groups of digital gray data into the second group of gray voltages.

BRIEF DESCRIPTION OF THE DRAWINGS

The present invention will become more apparent by describing embodiments thereof in detail with reference to the accompanying drawings in which:

FIG. 17B shows polarity of subpixels in the LCD shown in FIG. 17A;

DETAILED DESCRIPTION OF EMBODIMENTS

Figure 1:
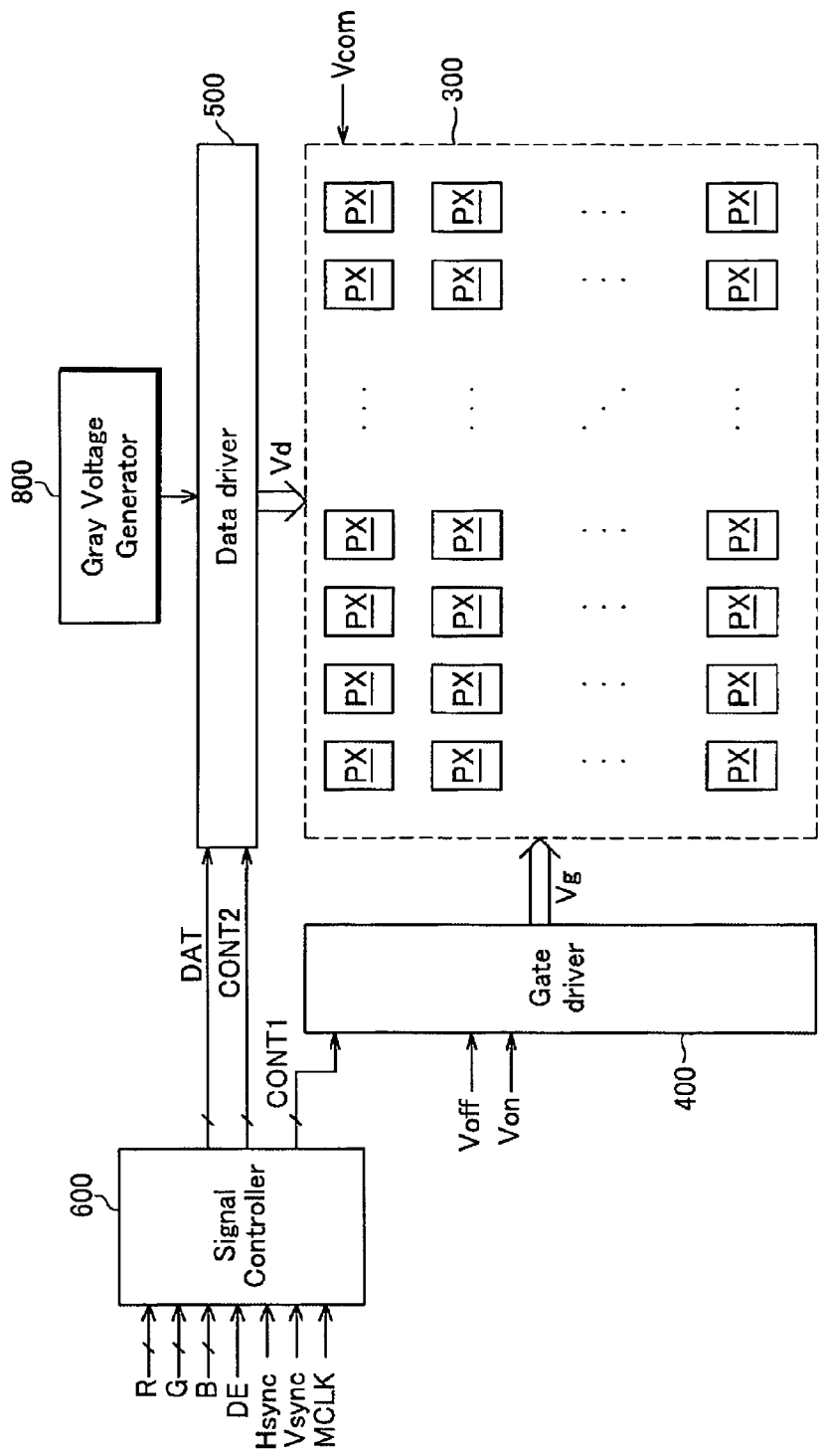
FIG. 1 is a block diagram of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an embodiment of the present invention will be described in detail with reference to FIGS. 1 and 2.

Figure 2:
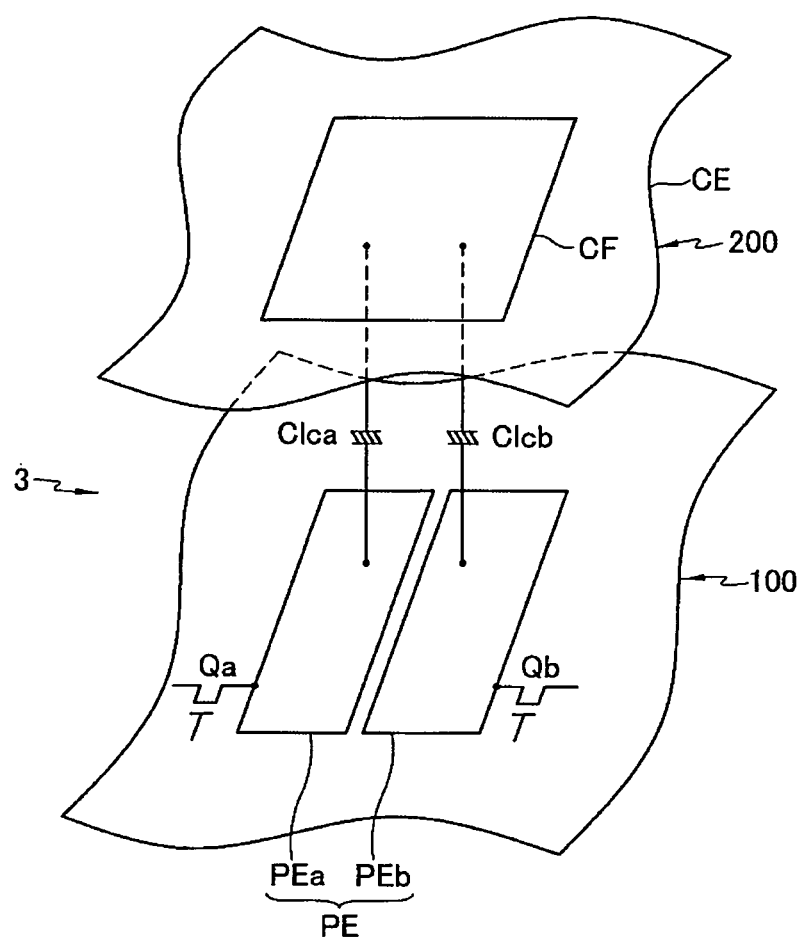
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment includes a LC panel assembly 300, a gate driver 400 and a data driver 500 that are connected to the panel assembly 300, a gray voltage generator 800 connected to the data driver 500, and a signal controller 600 controlling the above elements.

Referring to FIG. 1, the panel assembly 300 includes a plurality of signal lines (not shown) and a plurality of pixels PX connected thereto and arranged substantially in a matrix. In a structural view shown in FIG. 2, the panel assembly 300 includes a lower panel 100, an upper panel 200, and a LC layer 3 interposed therebetween.

The signal lines include a plurality of gate lines (not shown) transmitting gate signals (also referred to as "scanning signals"), and a plurality of data lines (not shown) transmitting data signals. The gate lines extend substantially in a row direction and substantially parallel to each other, while the data lines extend substantially in a column direction and substantially parallel to each other.

Referring to FIG. 2, each pixel PX includes a pair of subpixels PXa and PXb. Each subpixel PXa/PXb includes a liquid crystal (LC) capacitor Clca/Clcb and a switching element Qa/Qb connected to a gate line, a data line, and a LC capacitor Clca/Clcb.

The switching element Qa/Qb including a thin film transistor (TFT) is provided on the lower panel 100 and has three terminals: a control terminal connected to the gate line; an input terminal connected to the data line; and an output terminal connected to both the LC capacitor Clca/Clcb.

The LC capacitor Clca/Clcb includes a subpixel electrode PEa/PEb and a common electrode CE provided on an upper panel 200 as two terminals. The LC layer 3 disposed between the electrodes PEa/PEb and CE functions as dielectric of the LC capacitor Clca/Clcb. A pair of subpixel electrodes PEa and PEb are separated from each other and form a pixel electrode PE. The common electrode CE is supplied with a common voltage Vcom and covers an entire surface of the upper panel 200. In other embodiments, the common electrode CE may be provided on the lower panel 100, and at least one of the electrodes PE and CE may have a shape of a bar or a stripe.

For color display, each pixel PX uniquely represents one of primary colors (i.e., spatial division) or each pixel PX sequentially represents the primary colors in turn (i.e., temporal division) such that spatial or temporal sum of the primary colors are recognized as a desired color. An example of a set of the primary colors includes red, green, and blue colors. FIG. 2 shows an example of spatial division in that each pixel PX includes a color filter CF representing one of the primary colors in an area of the upper panel 200 facing the pixel electrode 190. Alternatively, the color filter CF is provided on or under the subpixel electrode PEa or PEb on the lower panel 100.

One or more polarizers (not shown) are attached to at least one of the panels 100 and 200.

Referring to FIG. 1 again, the gray voltage generator 800 generates a plurality of gray voltages related to the transmittance of the pixels PX. However, the gray voltage generator 800 may generate only a given number of gray voltages (referred to as reference gray voltages) instead of generating all of the gray voltages.

The gate driver 400 is connected to the gate lines of the panel assembly 300 and synthesizes the gate-on voltage Von and the gate-off voltage Voff from an external device to generate gate signals Vg for application to the gate lines.

The data driver 500 is connected to the data lines of the panel assembly 300 and applies data voltages Vd, which are selected from the gray voltages supplied from the gray voltage generator 800, to the data lines. However, the data driver 500 may generate gray voltages for all the grays by dividing the reference gray voltages and select the data voltages Vd from the generated gray voltages when the gray voltage generator 800 generates reference gray voltages.

The signal controller controls the gate driver 400 and the data driver, etc.

Each of the driving units 400, 500, 600, 700 and 800 may include at least one integrated circuit (IC) chip mounted on the LC panel assembly 300 or on a flexible printed circuit (FPC) film in a tape carrier package (TCP) type, which are attached to the panel assembly 300. Alternately, at least one of the processing units 400, 500, 600, 700 and 800 may be integrated into the panel assembly 300 along with the signal lines and the switching elements Qa and Qb. Alternatively, all the processing units 400, 500, 600, 700 and 800 may be integrated into a single IC chip, but at least one of the processing units 400, 500, 600, 700 and 800 or at least one circuit element in at least one of the processing units 400, 500, 600, 700 and 800 may be disposed out of the single IC chip.

Now, LCDs according to embodiments of the present invention will be described in detail with reference to FIGS. 3A, 3B, 3C, 4A and 4B.

Figure 3A:
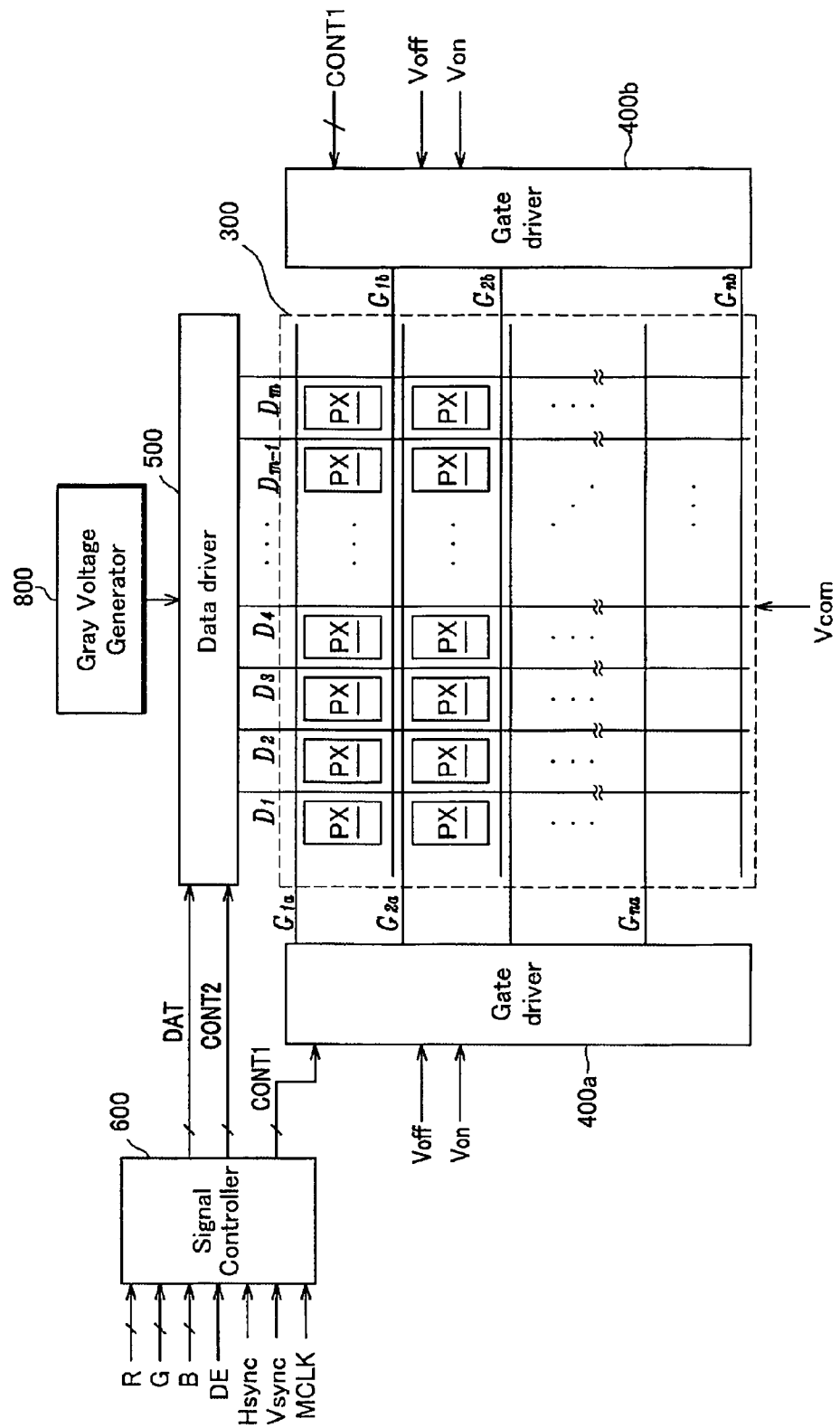
FIGS. 3A, 3B and 3C are block diagrams of LCDs according to embodiments of the present invention.
Figure 3B:
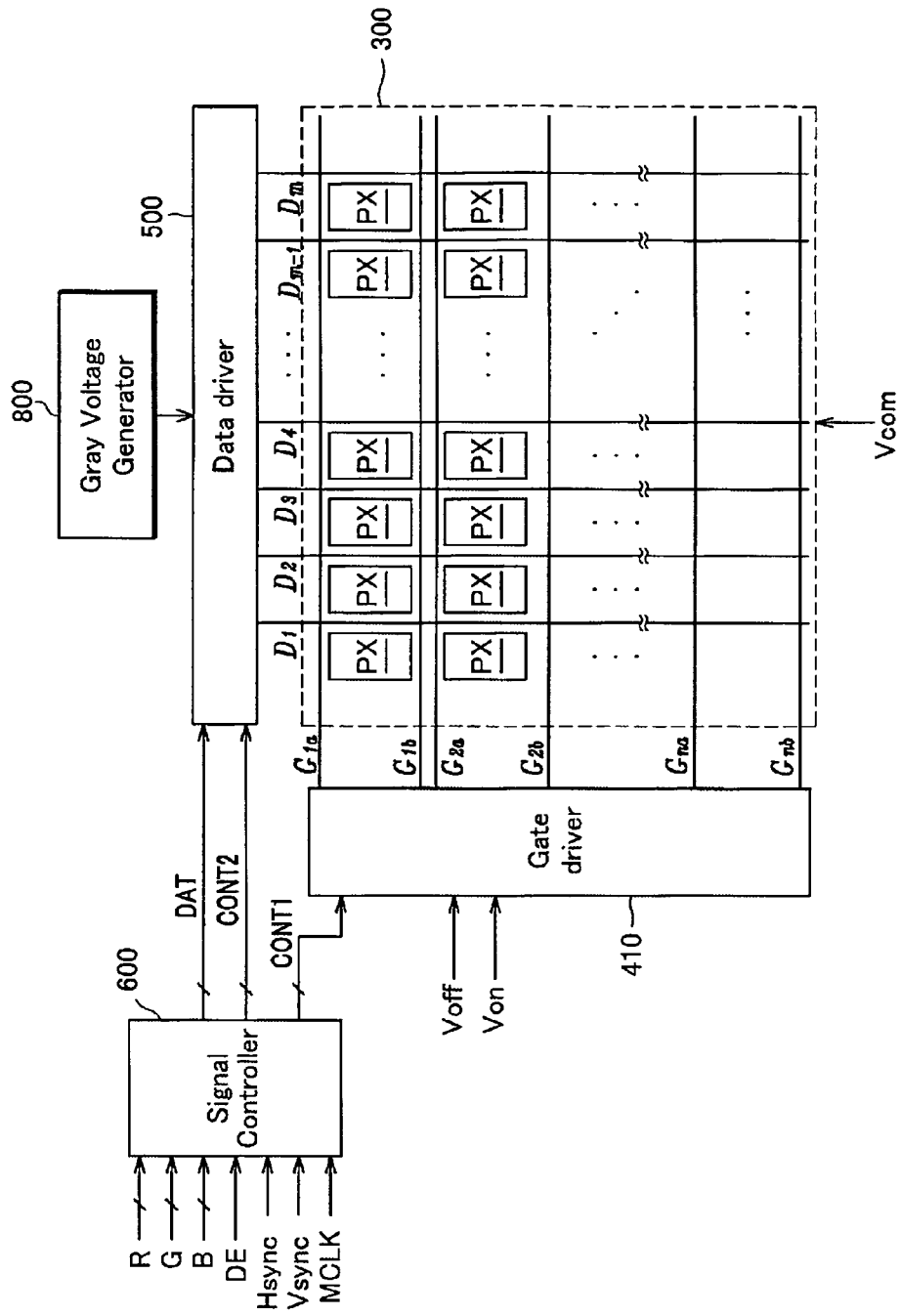
Figure 3C:
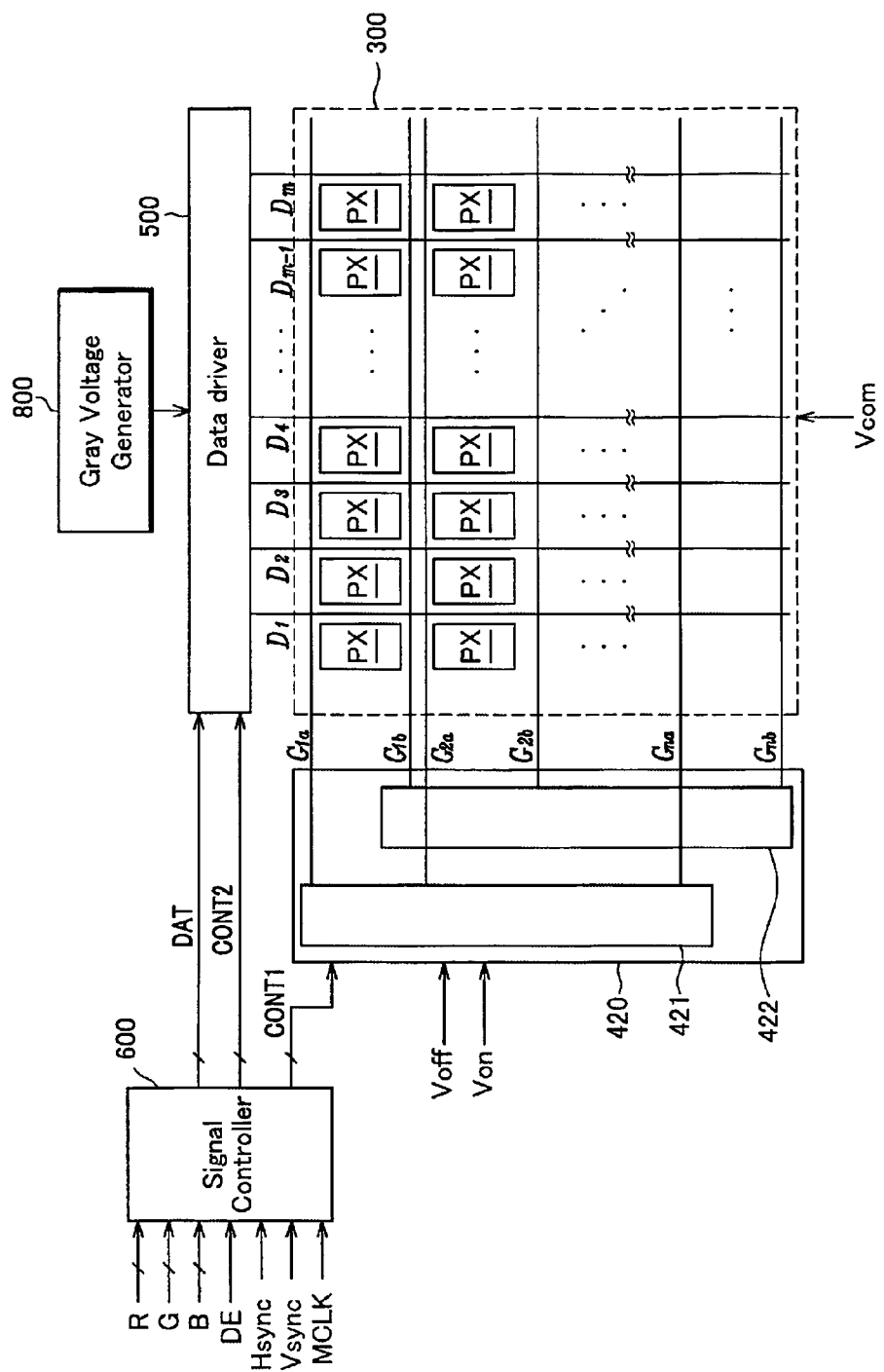
Figure 4A:
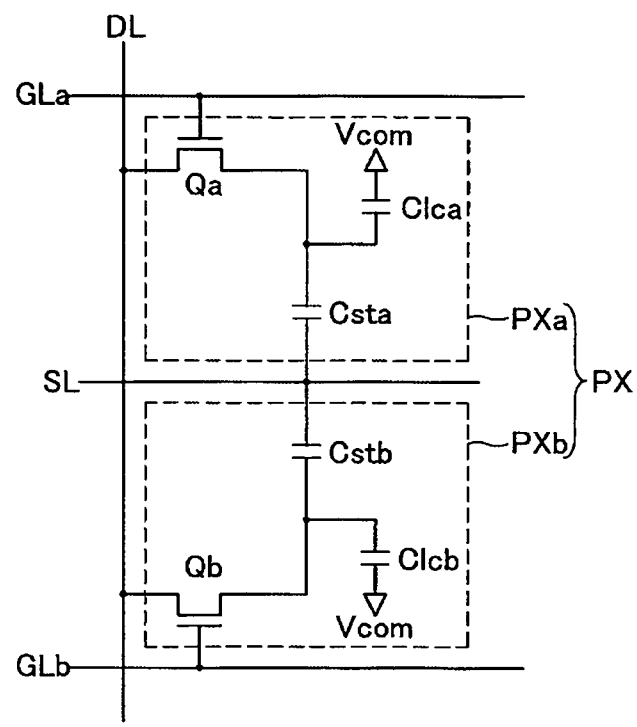
FIGS. 4A and 4B are equivalent circuit diagrams of a pixel of LCDs according to embodiments of the present invention.
Figure 4B:
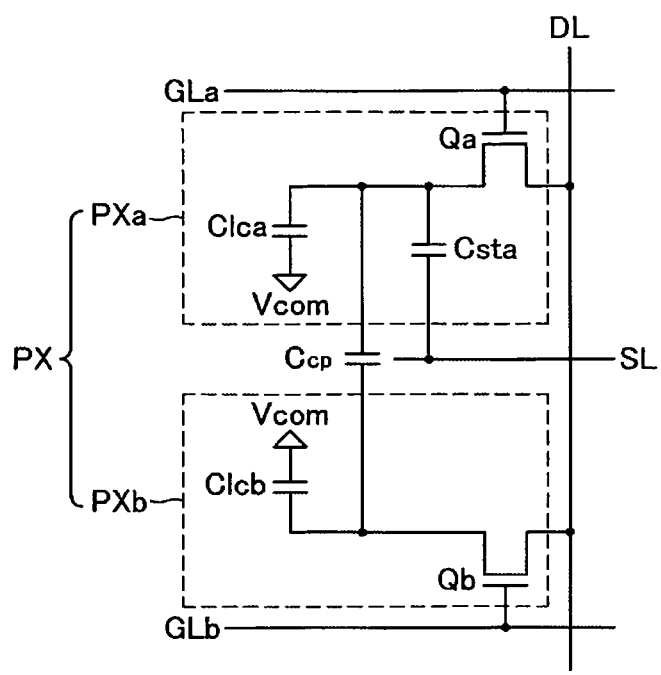

FIGS. 3A, 3B and 3C are block diagrams of LCDs according to embodiments of the present invention, and FIGS. 4A and 4B are equivalent circuit diagrams of a pixel of LCDs according to embodiments of the present invention.

Referring to FIGS. 3A-3C, an LCD according to an embodiment includes a LC panel assembly 300, a (pair of) gate driver(s) 400a, 400b, 410 and 420, a data driver 500, a gray voltage generator 800, and a signal controller 600.

The panel assembly 300 includes a plurality of signal lines and a plurality of pixels PX connected thereto and arranged substantially in a matrix.

The signal lines are provided on the lower panel 100 (shown in FIG. 2) and include a plurality of pairs of gate line and a plurality of data line.

FIGS. 4A and 4B show equivalent circuit diagrams of the signal lines and pixels PX. The display signal lines include an upper gate line GLa, a lower gate line GLb, a data line DL, and a storage electrode line SL extending substantially parallel to the gate lines GLa and GLb.

Each pixel PX in the LCD shown in FIG. 4A includes a pair of subpixels PXa and PXb. Each subpixel PXa/PXb includes a switching element Qa/Qb connected to one of the gate lines GLa and GLb and the data line DL, a liquid crystal (LC) capacitor Clca/Clcb connected to the switching element Qa/Qb, and a storage capacitor Csta/Cstb connected between the switching element Qa/Qb and the storage electrode line SL. The storage capacitors Csta and Cstb may be omitted, and in this case, the storage electrode line SL may also be omitted.

Each pixel in the LCD shown in FIG. 4B includes a pair of subpixels PXa and PXb and a coupling capacitor Ccp connected between the subpixels PXa and PXb. Each subpixel PXa/PXb includes a switching element Qa/Qb connected to one of the gate lines GLa and GLb and the data line DL and a liquid crystal (LC) capacitor Clca/Clcb connected to the switching element Qa/Qb. One subpixel PXa includes a storage capacitor Csta connected between the switching element Qa and the storage electrode line SL.

The storage capacitor Csta/Cstb is an auxiliary capacitor for the LC capacitor Clca/Clcb. The storage capacitor Csta/Cstb includes the subpixel electrode PEa/PEb and a separate signal line, which is provided on the lower panel 100, overlapping the subpixel electrode PEa/PEb via an insulator, and is supplied with a predetermined voltage such as the common voltage Vcom. Alternatively, the storage capacitor Csta/Cstb includes the subpixel electrode PEa/PEb and an adjacent gate line called a previous gate line, which overlaps the pixel electrode Csta/Cstb via an insulator.

Referring to FIGS. 3A-3C again, the gate driver 400a, 400b, 410 or 420 is connected to the gate line $G_{1a}$-$G_{nb}$ and synthesizes the gate-on voltage Von and the gate-off voltage Voff from an external device to generate gate signals for application to the gate lines $G_{1a}$-$G_{nb}$. In FIG. 3A, a pair of gate drivers 400a and 400b are disposed at left and right sides of the panel assembly 300 and odd and even gate lines $G_{1a}$-$G_{nb}$, respectively. Each of the gate drivers 410 and 420 shown in FIGS. 3B and 3C is disposed at one side of the panel assembly 300 and connected to all the gate lines $G_{1a}$-$G_{nb}$. The gate driver 420 shown in FIG. 3C includes two driving circuits 421 and 422 connected to odd and even gate lines $G_{1a}$-$G_{nb}$, respectively.

The gray voltage generator 800 generates two sets of (reference) gray voltages related to the transmittance of the pixels. The two sets are individually applied to the two subpixels PXa and PXb. Each set of gray voltages includes the gray voltages having a positive polarity with respect to the common voltage Vcom and the gray voltages having a negative polarity with respect to the common voltage Vcom. However, the gray voltage generator 800 may generate only one set of (reference) gray voltages.

Now, examples of gray voltage generators and data drivers in the LCDs shown in FIGS. 3A-4B are described in detail with reference to FIGS. 5A, 5B and 5C.

Figure 5A:
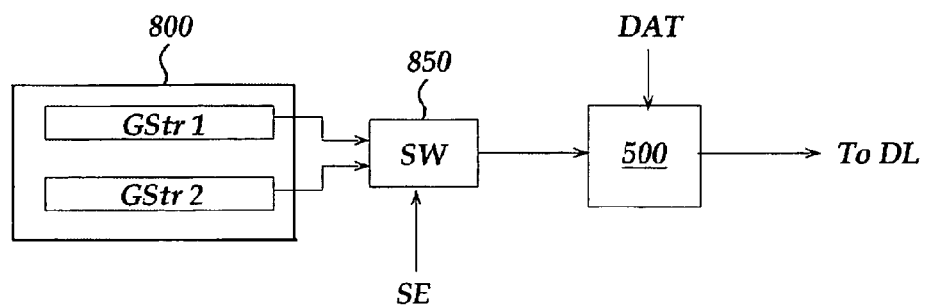
FIGS. 5A, 5B and 5C show examples of gray voltage generators and data drivers in the LCDs shown in FIGS. 3A-4B.

An exemplary LCD shown in FIG. 5A includes a data driver 500, a gray voltage generator 800 and an analog switch (SW) 850 as independent elements. The gray voltage generator 800 includes two voltage generating resistor series GStr1 and GStr2. The analog switch 850 is connected between the gray voltage generator 800 and the data driver 500 and selects one of two groups of gray voltages supplied from the gray voltage generator 800 in response to a selection signal SE.

Figure 5B:
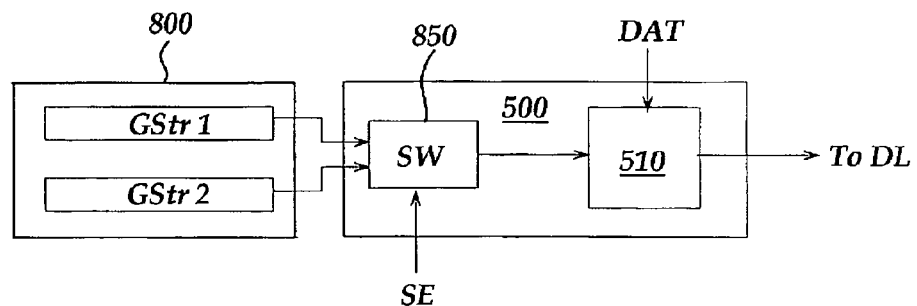

An exemplary LCD shown in FIG. 5B incorporates the analog switch 850 shown in FIG. 5A into the data driver 500. Reference numeral 510 denotes a conventional data driver unit.

Figure 5C:
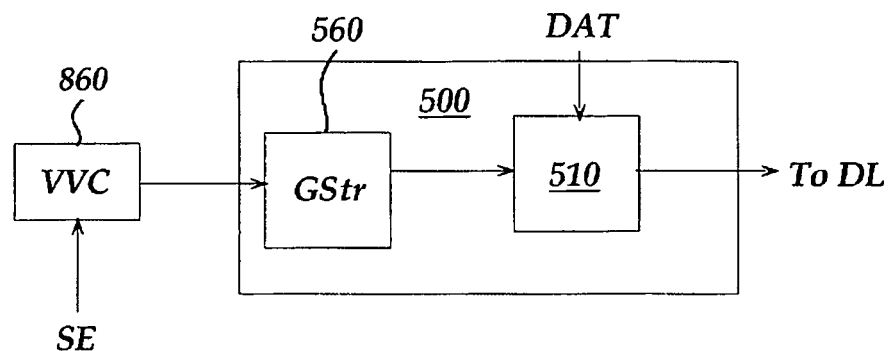

An exemplary LCD shown in FIG. 5C includes a reference voltage changing circuit (VCC) 860 instead of the gray voltage generator 800. The reference voltage changing circuit 860 generates a few number of reference voltages having magnitude that varies depending on a selection signal SE. The data driver 500 includes a voltage generating resistor string (GStr) 560 generating gray voltages and generates different groups of gamma voltages according to the reference voltages supplied by the reference voltage changing circuit 860.

Figure 6:
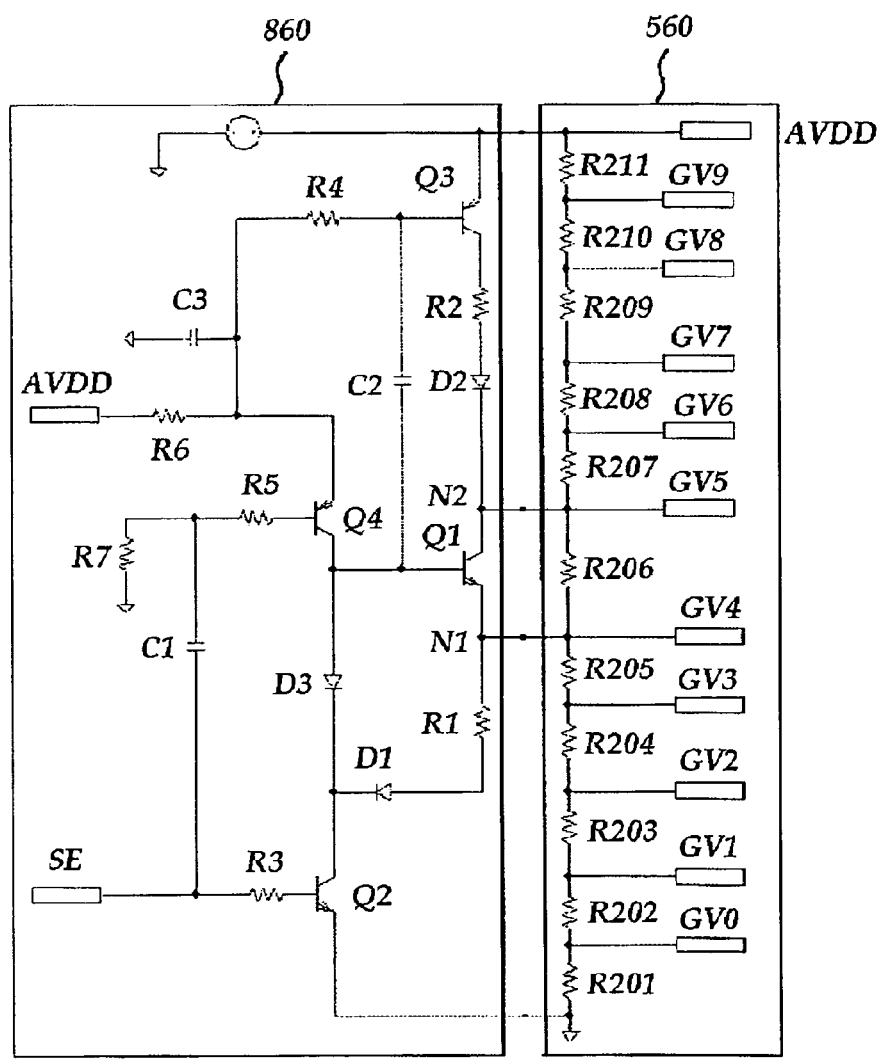
FIG. 6 is a block diagram of a reference voltage changing circuit and a voltage generating resistor string according to an embodiment of the present invention.

An example of the reference voltage changing circuit and the voltage generating resistor string shown in FIG. 5C is illustrated in FIG. 6.

Referring to FIG. 6, a voltage generating resistor string 560 includes a plurality of resistors R201-R211 connected in series, a center resistor R206, and first and second groups of five resistors coupled to both ends of the center resistor R206. The first group of resistors R201-R205 has an end coupled to a low voltage and the second group of resistors R207-R211 has an end coupled to a supply voltage AVDD.

A reference voltage changing circuit 860 includes NPN and PNP bipolar transistors Q1, Q2 and Q3, a pair of a resistor R1 and a diode D1, and another pair of a resistor R2 and a diode D2. The NPN and PNP bipolar transistors Q1, Q2 and Q3 are connected between a center resistor R206, a first resistor group R201-R205, and a second resistor group R207-R211. The pairs of resistor and diode R1, D1 and R2, D2 are connected between the transistors Q1, Q2 and Q3. A PNP transistor Q4 is connected between a high voltage input terminal supplied with a supply voltage AVDD and the transistor Q3, and the transistor Q4 has a base supplied with a low voltage through resistors R5 and R7 and is connected to the transistor Q3 through a diode D3. The NPN transistor Q2 is connected to a selection signal (SE) input terminal through the resistor R3, and the PNP transistor Q3 is connected to the high voltage input terminal through resistors R4 and R6. A capacitor C2 is connected between the bases of the transistors Q1 and Q3, a capacitor C1 is connected between the transistors Q2 and Q4 through resistors R3 and R5, and a capacitor C3 is connected between the resistors R4 and R6.

In this reference voltage changing circuit 860, the transistor Q3 always turns on to transmit the supply voltage AVDD. When the selection signal SE has a low value, the transistor Q4 turns off to cut the connection to the high voltage, and the transistor Q2 turns on to make a path to the low voltage. Therefore, nodes N1 and N2 are supplied with the low voltage.

On the contrary, when the selection signal SE has a high value, the transistor Q2 turns off to cut the connection to the low voltage, and the transistor Q4 turns on to make a path to the high voltage. Therefore, the nodes N1 and N2 are supplied with a high voltage determined by the resistors R1, R6, etc.

Now, the operation of the above-described LCD will be described in detail.

The signal controller 600 is supplied with input image signals R, G and B and input control signals controlling the display thereof from an external graphics controller (not shown). The input image signals R, G and B contains luminance information of each pixel PX, and the luminance has a predetermined number of, for example $1024(=2^{10})$, $256(=2^8)$ or $64(=2^6)$ grays. The input control signals include a vertical synchronization signal Vsync, a horizontal synchronization signal Hsync, a main clock MCLK, and a data enable signal DE, etc.

After generating gate control signals CONT1 and data control signals CONT2 and processing the image signals R, G and B suitable for the operation of the panel assembly 300 on the basis of the input control signals and the input image signals R, G and B, the signal controller 600 transmits the gate control signals CONT1 to the gate driver 400a, 400b, 410, 420, and the processed image signals DAT and the data control signals CONT2 to the data driver 500. The processing of the image signals R, G and B includes the rearrangement of the image data R, G and B according to the pixel arrangement of the panel assembly 300 shown in FIG. 3.

The gate control signals CONT1 include a scanning start signal STV for instructing to start scanning and at least a clock signal for controlling the output time of the gate-on voltage Von. The gate control signals CONT1 may further include an output enable signal OE for defining the duration of the gate-on voltage Von. The clock signals may be used as the selection signal SE illustrated in FIGS. 5A-5C and 6.

The data control signals CONT2 include a horizontal synchronization start signal STH for informing of start of data transmission for a group of subpixels PXa and PXb, a load signal LOAD for instructing to apply the data voltages to the data lines $D_1$-$D_m$, and a data clock signal HCLK. The data control signal CONT2 may further include an inversion signal RVS for reversing the polarity of the data voltages (with respect to the common voltage Vcom).

Responsive to the data control signals CONT2 from the signal controller 600, the data driver 500 receives a packet of the image data DAT for the group of subpixels PXa and PXb from the signal controller 600 and receives one of the two sets of gray voltages supplied from the gray voltage generator 800. The data driver 500 converts the image data DAT into analog data voltages selected from the gray voltages supplied from the gray voltage generator 800, and applies the data voltages to the data lines $D_1$-$D_m$.

Otherwise, a separately provided external selection circuit 850 but not the data driver 500 may select and transmits one of the two groups of gray voltages to the data driver 500 as shown in FIG. 5A. In another embodiment shown in FIG. 5C, the gray voltage generator 800 supplies reference voltages having varying magnitudes, which is divided by the data driver 500 to form gray voltages.

The gate driver 400a, 400b, 410 and 420 applies the gate-on voltage Von to the gate line $G_{1a}$-$G_{nb}$ in response to the gate control signals CONT1 from the signal controller 600, thereby turning on the switching elements Qa and Qb connected thereto. The data voltages applied to the data lines $D_1$-$D_m$ are supplied to the subpixels PXa and PXb through the activated switching elements Qa and Qb.

The difference between the data voltage and the common voltage Vcom is represented as a voltage across the LC capacitor Clca and Clcb, which is referred to as a pixel voltage. The LC molecules in the LC capacitor Clca and Clcb have orientations depending on the magnitude of the pixel voltage, and the molecular orientations determine the polarization of light passing through the LC layer 3. The polarizer(s) converts the light polarization into the light transmittance such that the pixels PX display the luminance represented by the image data DAT.

Figure 7A:
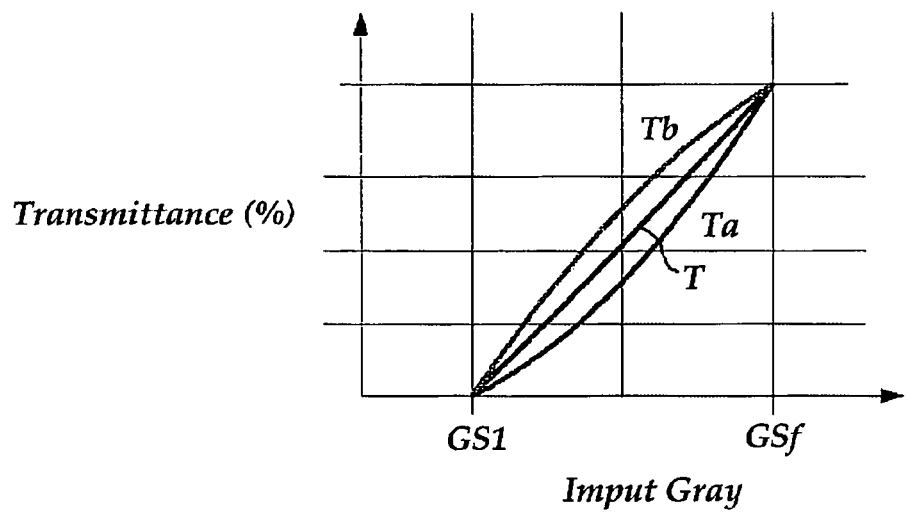
FIG. 7A is a graph illustrating gamma curves in an LCD according to an embodiment of the present invention.
Figure 7B:
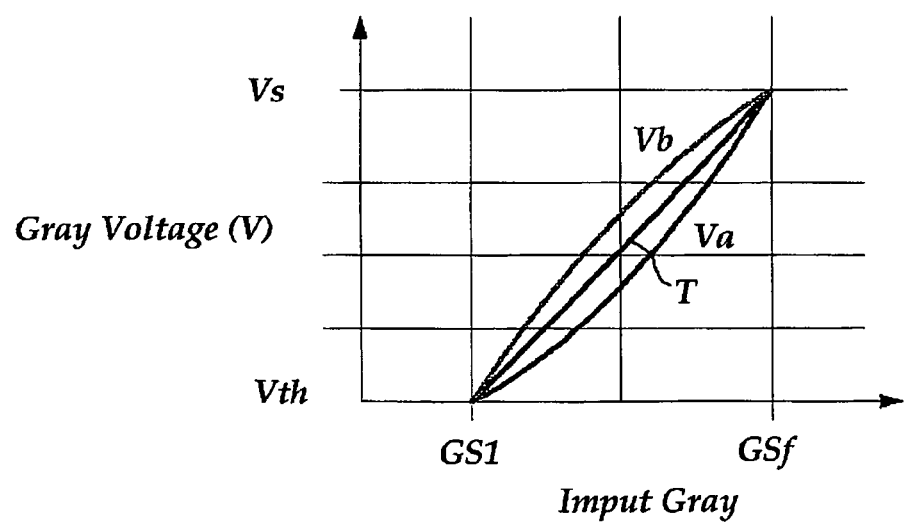
FIG. 7B is a graph illustrating gray voltages as function of input grays in an LCD according to an embodiment of the present invention.

The above-described two groups of gray voltages show two different gamma curves Ta and Tb as shown in FIG. 7A. Since the two groups are supplied with the two subpixels PXa and PXb of a pixel PX, the synthesis T of the two gamma curves Ta and Tb form a gamma curve for a pixel PX. The two groups of the gray voltages are preferably determined such that the synthesized gamma curve T approaches a reference gamma curve at a front view. For example, the synthesized gamma curve at a front view coincides with the most suitable reference gamma curve at a front view, and the synthesized gamma curve T at a lateral view is the most similar to the reference gamma curve at a front view. In FIG. 7A, GS1 and GSf denote the lowest input gray and the highest input gray, respectively. For example, the lower gamma curve may be further lowered for improvement of the visibility.

By repeating this procedure by a unit of half of a horizontal period (which is denoted by "½H" and equal to half period of the horizontal synchronization signal Hsync or the data enable signal DE), all gate lines $G_{1a}$-$G_{nb}$ are sequentially supplied with the gate-on voltage Von during a frame, thereby applying the data voltages to all pixels.

When the next frame starts after one frame finishes, the inversion control signal RVS applied to the data driver 500 is controlled such that the polarity of the data voltages is reversed (which is referred to as "frame inversion"). The inversion control signal RVS may be also controlled such that the polarity of the image data signals flowing in a data line are periodically reversed during one frame (for example, row inversion and dot inversion), or the polarity of the image data signals in one packet are reversed (for example, column inversion and dot inversion).

However, the charging time of the above-described LCD may be too short for the pixels PX to reach the target luminance since the LCD have the gate lines twice the number of the gate lines of a conventional LCD, and the inversion may further decrease the charging time.

The charging time can be increased by making the application of the gate-on voltage to adjacent two gate lines partly overlap, which can be realized by employing the gate driver shown in FIGS. 3A and 3B.

Now, several types of data voltage application will be described in detail with reference to FIGS. 8A, 8B and 8C.

Figure 8A:
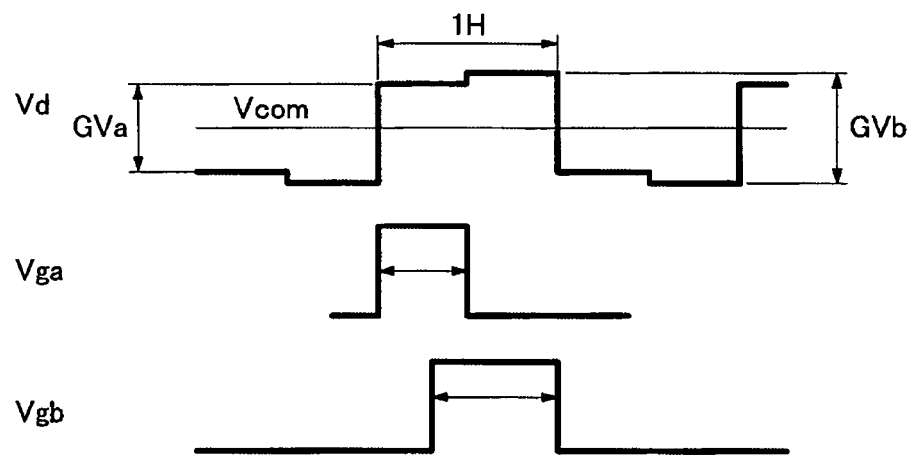
FIGS. 8A, 8B and 8C illustrate waveforms of signals in an LCD according to an embodiment of the present invention.
Figure 8B:
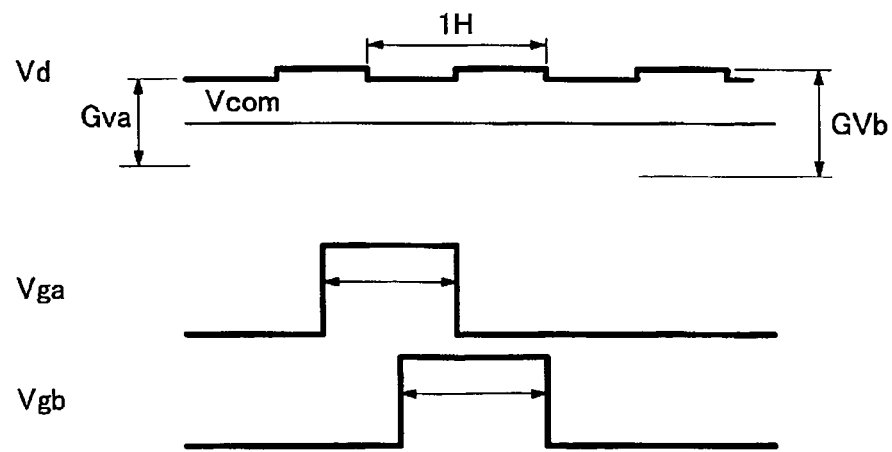
Figure 8C:
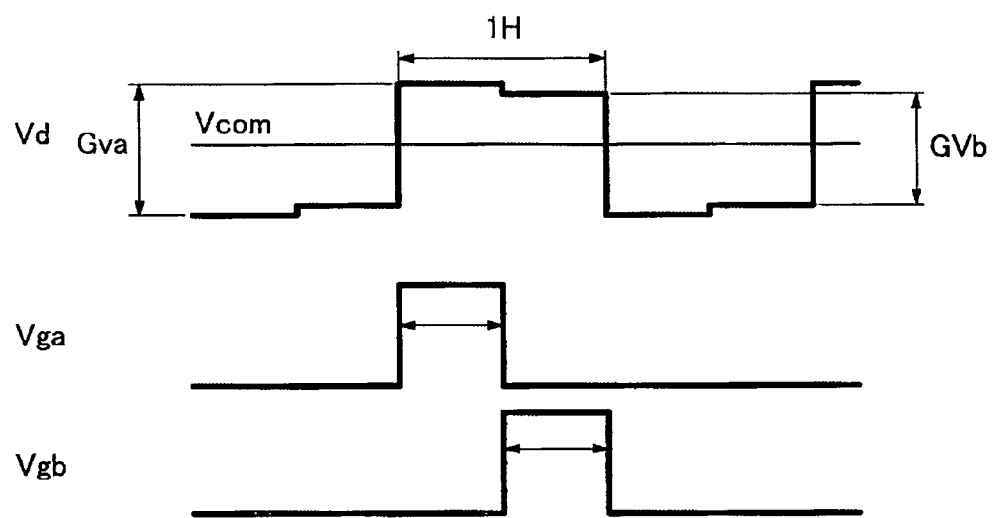

FIGS. 8A, 8B and 8C illustrate waveforms of signals in an LCD according to an embodiment of the present invention. Reference character Vga denotes a gate signal applied to an upper gate line, reference character Vgb denotes a gate signal applied to a lower gate line, and reference character Vd denotes data voltages carried by a data line.

In case of dot inversion, since adjacent pixels have opposite polarities, the provision of a data voltage for an adjacent pixel may not considerably improve the charging time. Accordingly, the charging times for adjacent pixels do not preferably overlap each other, and the charging times for adjacent subpixels of one pixel preferably overlap each other as shown in FIG. 8A. In addition, it is preferable that the magnitude Vgb of the group of gray voltages applied to the latterly-charged subpixel is larger than the magnitude Vga of the group of gray voltages applied to the firstly-charged subpixel as shown in FIGS. 8A and 8B.

In case of the column inversion, since two pixels adjacent in a column have the same polarity, a subpixel can be pre-charged with a data voltage of an adjacent pixel. Accordingly, the charging times of all the adjacent subpixels can be overlapped for a predetermined time as shown in FIG. 8B.

FIG. 8C shows a case that the gate-on voltage is applied to only one gate line at a time like the gate driver shown in FIG. 1B.

Now, LCDs according to embodiments of the present invention will be described in detail with reference to FIGS. 9, 10 and 11.

Figure 9:
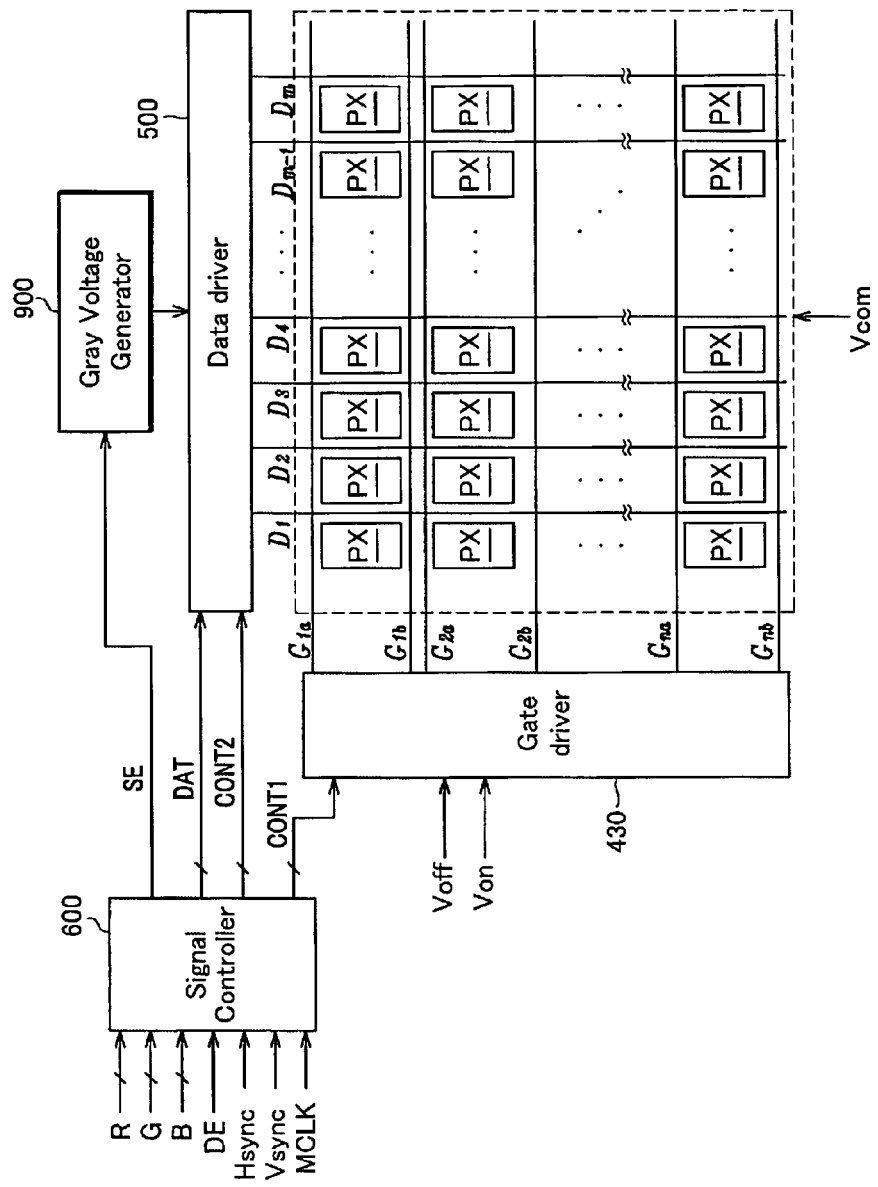
FIG. 9 is a block diagram of an LCD according to another embodiment of the present invention.
Figure 10:
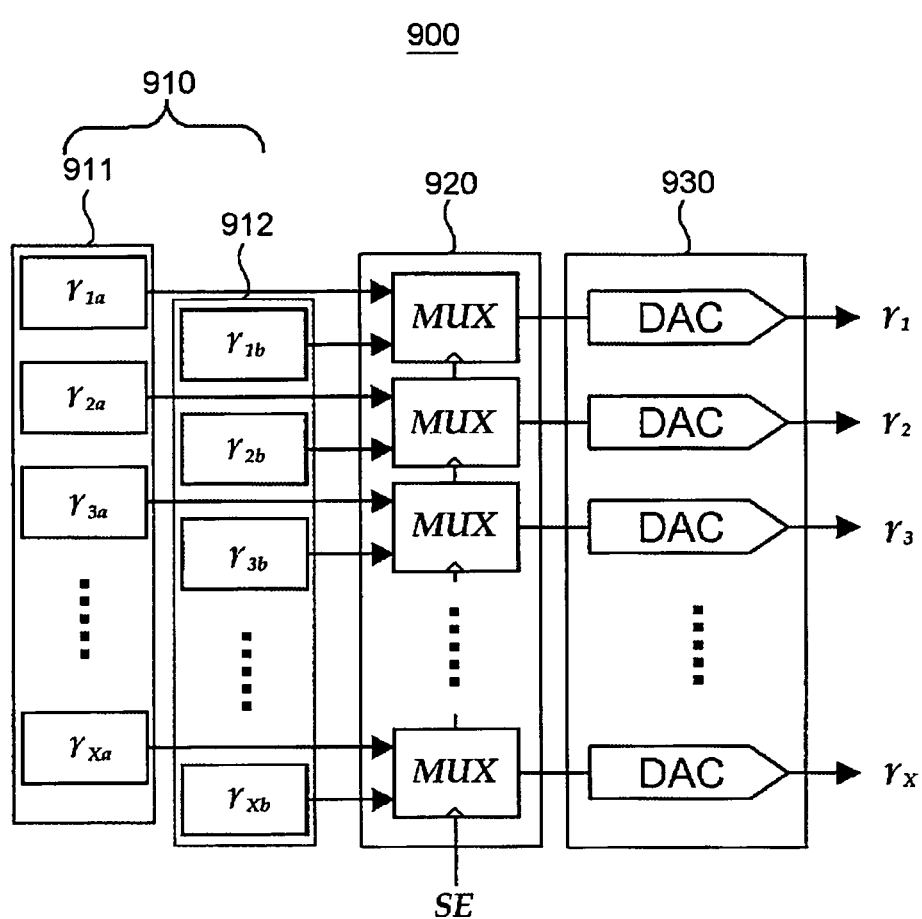
FIG. 10 is a block diagram of a gray voltage generator according to an embodiment of the present invention.
Figure 11:
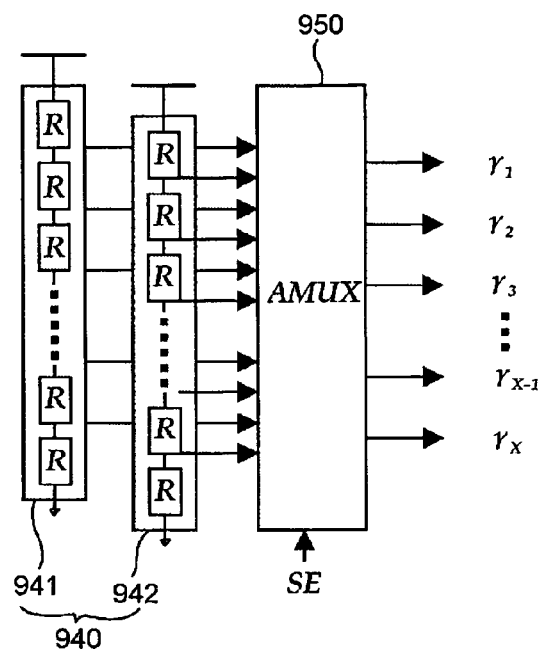
FIG. 11 a block diagram of a gray voltage generator according to another embodiment of the present invention.

FIG. 9 is a block diagram of an LCD according to another embodiment of the present invention, FIG. 10 is a block diagram of a gray voltage generator according to an embodiment of the present invention, and FIG. 11 a block diagram of a gray voltage generator according to another embodiment of the present invention.

An LCD shown in FIG. 9 has a configuration similar to the LCD shown in FIG. 3B. That is, the LCD includes a LC panel assembly 300, a gate driver 430, a data driver 500, a gray voltage generator 900, and a signal controller 600.

The signal controller 600 according to this embodiment generates and outputs a selection signal SE for controlling the gray voltage generator 800.

The gray voltage generator 900 according to this embodiment either generates two separate groups of analog gray voltages and alternately outputs the two groups of analog gray voltages in response to the selection signal SE, or selects one of two groups of digital gray data that are stored in a place and generates a group of analog gray voltages based on the selected group of digital gray data. In the latter case, it is considered as that two groups of analog gray voltages corresponding to the two groups of digital gray data are alternately arranged. The two groups of gray voltages are respectively supplied to two subpixels forming a pixel. Each of the groups of gray voltages includes gray voltages having positive polarity with respect to the common voltage Vcom and gray voltage having negative polarity with respect to the common voltage Vcom. As described above, the gray voltage generator 900 may generate only a given number of reference gray voltages instead of generating all of the gray voltages.

The gray voltage generator 900 shown in FIG. 10 includes a register unit 910, a data selection unit 920, and a conversion unit 930.

The register unit 910 includes a pair of digital registers 911 and 912 that stores different sets of gray data $\gamma_{1a}$-$\gamma_{xa}$ and $\gamma_{1b}$-$\gamma_{xb}$ having a one-to-one correspondence.

The data selection unit 920 include a plurality of multiplexers (MUX) coupled to the digital registers 911 and 912. Each of the multiplexers (MUX) receives a pair of voltages ($r_{1a}·r_{1b}$, $r_{2a}·r_{2b}$, ..., $r_{xa}·r_{xb}$) as inputs from the digital registers 911 and 912 and outputs one of the receive pairs of voltages ($r_{1a}·r_{1b}$, $r_{2a}·r_{2b}$, ..., $r_{xa}·r_{xb}$) in response to a selection signal SE.

The conversion unit 930 includes a plurality of digital-to-analog converters (DAC) respectively coupled to the multiplexers (MUX). Each of the digital-to-analog converters (DAC) converts the digital data supplied from the multiplexer (MUX) into analog voltages ($r_1$, $r_2$, ..., $r_x$) and outputs the analog voltages ($r_1$, $r_2$, ..., $r_x$).

The gray voltage generator 900 shown in FIG. 11 includes a voltage generator 940 and an analog multiplexer (AMUX) 950.

The voltage generator 940 includes a pair of resistor strings 941 and 942. Each of resistor strings 941 and 942 generates a group of gray voltages, and the two groups of gray voltages have different magnitudes.

The analog multiplexer (AMUX) 950 selects and outputs one of two pairs of group of gray voltages received from the voltage generator 940 according to the selection signal SE.

Now, the operation of the above-described LCD shown in FIGS. 9-11 will be described in detail with reference to FIG. 12.

Figure 12:
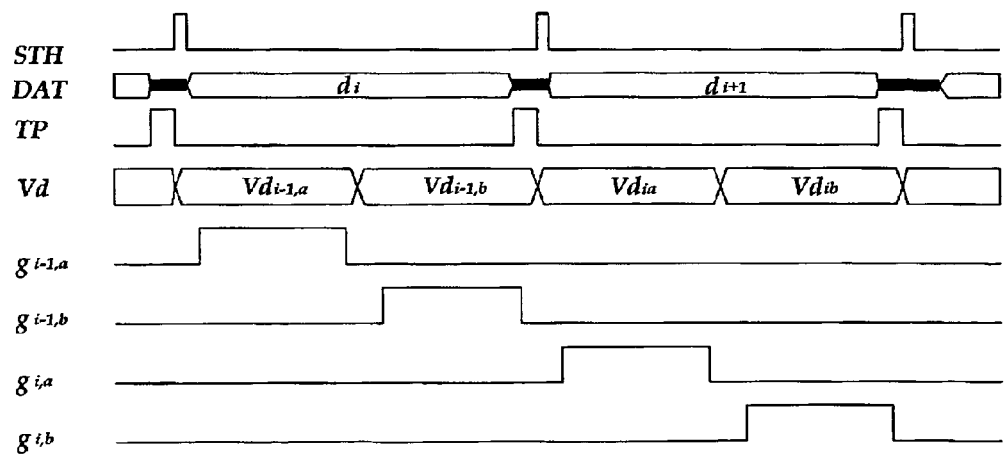
FIG. 12 shows waveforms of various signals in the LCD shown in FIGS. 9-11.

FIG. 12 shows waveforms of various signals in the LCD shown in FIGS. 9-11.

Like the above-description, the signal controller 600 processes input image signals R, G and B on the basis of input control signals and the input image signals R, G and B. The signal controller 600 generates gate control signals CONT1, data control signals CONT2, and a selection signal SE. The signal controller 600 transmits the gate control signals CONT1 to the gate driver 430 and the processed image signals DAT and the data control signals CONT2 to the data driver 500, and the signal controller 600 outputs the selection signal SE to the gray voltage generator 900.

The gate control signals CONT1 include a scanning start signal STV and at least a clock signal and may further include an output enable signal OE for defining the duration of the gate-on voltage Von. The data control signals CONT2 include a horizontal synchronization start signal STH, a load signal LOAD, and a data clock signal HCLK, and may further include an inversion signal RVS for reversing the polarity of the data voltages.

The selection signal SE instructs to select one of the two groups of gray voltages generated by the gray voltage generator 900, and has the same period as the horizontal synchronization start signal (STH), the load signal (TP), and so on.

The period of the clock signals in the gate control signals CONT1 may be twice the period of the horizontal synchronization start signal (STH) and in this case, the clock signals can be used as the selection signal SE.

The data driver 500 receives image data (di) for a packet of pixels PX, for example, for the i-th pixel row in synchronization with the data clock signal HCLK in response to pulses of the horizontal synchronization start signal (STH) from the signal controller 600. During the reception of the image data (di), the data driver 500 applies data voltages for a previous pixel row to the data lines $D_1$-$D_m$. After receiving the image data (di), the gray voltage generator 900 outputs a group of (reference) gray voltages determined by the selection signal SE, and the data driver 500 converts the image data (di) into analog data voltages selected from the gray voltages, and applies the data voltages to the data lines $D_1$-$D_m$.

As described above, the data driver 500 may generate gray voltages by dividing reference gray voltages.

The gate driver 430 applies the gate-on voltage Von to a gate line $G_{1a}$-$G_{nb}$, for example, a gate line connected to upper subpixels PXa in the i-th pixel row in response to the gate control signals CONT1, thereby turning on the switching elements Qa connected thereto. The data voltages applied to the data lines $D_1$-$D_m$ are supplied to the subpixels PXa through the activated switching elements Qa.

Next, the signal controller 600 changes the value of the selection signal SE such that the gray voltage generator 900 generates and outputs another set of (reference) gray voltages to the data driver 500. Then, the data driver 500 reselects gray voltages corresponding to the image data (di) among new gray voltages and applies the selected gray voltages to the data lines $D_1$-$D_m$ as data voltages.

The gate driver 430 applies the gate-on voltage Von to a gate line $G_{1a}$-$G_{nb}$, for example, a gate line connected to lower subpixels PXb in the i-th pixel row in response to the gate control signals CONT1, thereby turning on the switching elements Qb connected thereto. The data voltages applied to the data lines $D_1$-$D_m$ are supplied to the subpixels PXb through the activated switching elements Qb.

Now, an LCD according to another embodiment of the present invention will be described in detail with reference to FIGS. 13 and 14.

Figure 13:
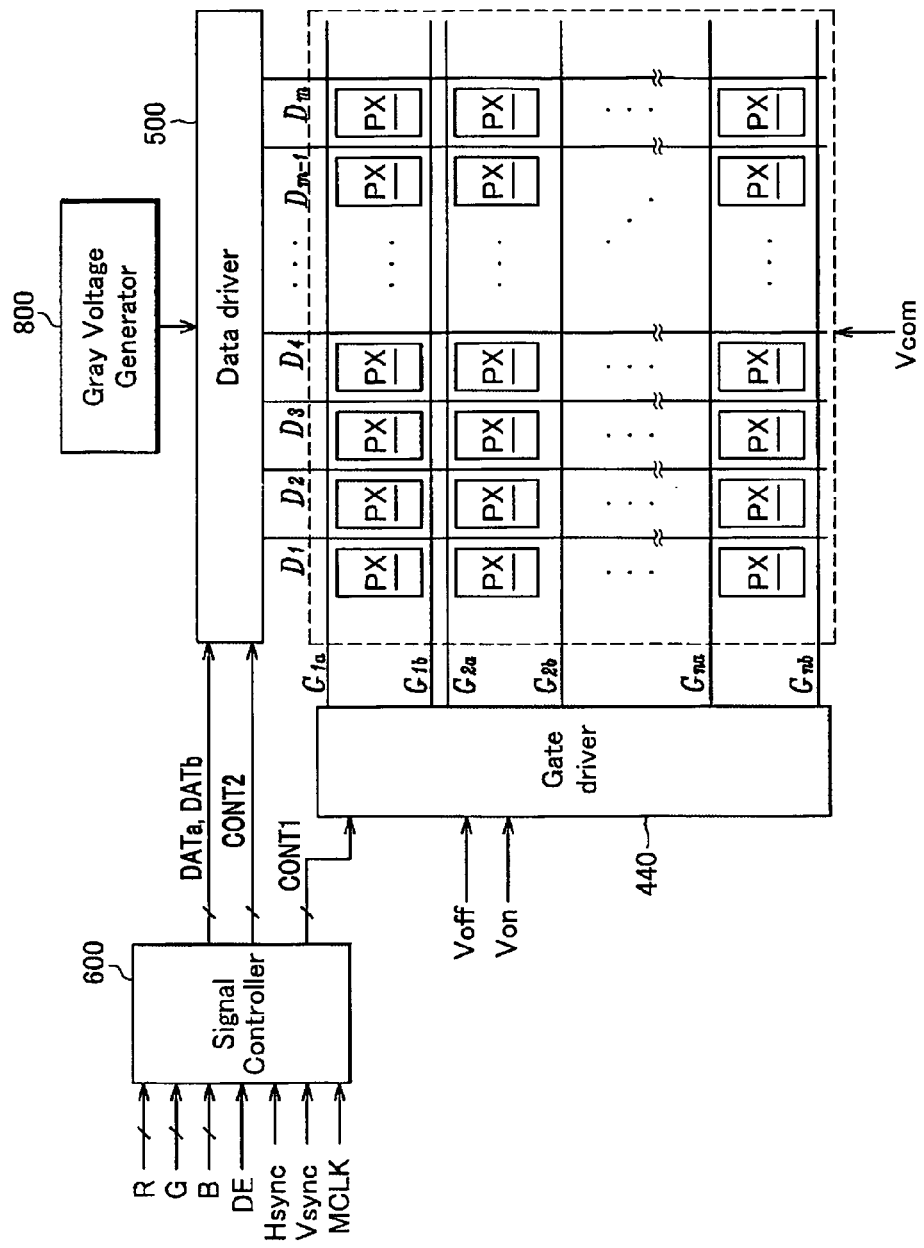
FIG. 13 is a block diagram of an LCD according to another embodiment of the present invention.
Figure 14:
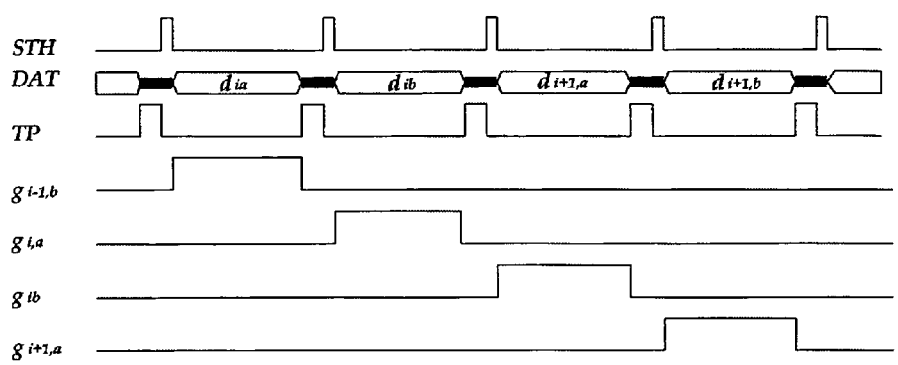
FIG. 14 shows waveforms of various signals in the LCD shown in FIG. 13.

FIG. 13 is a block diagram of an LCD according to another embodiment of the present invention, and FIG. 14 shows waveforms of various signals in the LCD shown in FIG. 13.

An LCD shown in FIG. 13 has a configuration similar to the LCD shown in FIG. 9. That is, the LCD includes a LC panel assembly 300, a gate driver 440, a data driver 500, a gray voltage generator 900, and a signal controller 600.

However, the signal controller 600 according to this embodiment does not generate a selection signal SE, and the gray voltage generator 800 and the data driver 500 generates a group of (reference) gray voltages related to the transmittance of pixels PX and generates data voltages based on the group of (reference) gray voltages.

Instead, the signal controller 600 converts an input image signal R, G and B into a pair of output image signals DATa and DATb. Here, the conversion of the image signals is performed by a mapping determined by experiments and stored in a lookup table (not shown) or performed by an operation of the signal controller 600.

The data driver 500 receives image data (dia) for a packet of subpixels PXa and PXb, for example, for upper subpixels PXa in the i-th pixel row in synchronization with the data clock signal HCLK in response to pulses of the horizontal synchronization start signal (STH) from the signal controller 600. During the reception of the image data (dia), the data driver 500 applies data voltages for lower subpixels PXb of a previous pixel row to the data lines $D_1$-$D_m$. After receiving the image data (dia), the gray voltage generator 900 converts the image data (dia) into analog data voltages selected from the gray voltages and applies the data voltages to the data lines $D_1$-$D_m$ according to the pulses of the load signal TP from the signal controller 600.

The gate driver 440 applies the gate-on voltage Von to a gate line $G_{1a}$-$G_{nb}$, for example, an upper gate line $G_{ia}$ connected to upper subpixels PXa in the i-th pixel row in response to the gate control signals CONT1, thereby turning on the switching elements Qa connected thereto. The data voltages applied to the data lines $D_1$-$D_m$ are supplied to the subpixels PXa through the activated switching elements Qa. In FIG. 14, reference characters $g_{ia}$ and $g_{ib}$ denote gate signals applied to upper and lower gate lines $G_{ia}$ and $G_{ib}$ of the i-th pixel row, respectively.

After finishing the transmission of the image data (dia) for the upper subpixels PXa in the i-th pixel row, the signal controller 600 transmits the image data (dib) for the lower subpixels PXb in the i-th pixel row along a new pulse of the horizontal synchronization start signal (STH) to the data driver 500. Thereafter, the signal controller 600 gives another pulse to the load signal TP such that the data driver 500 selects gray voltages corresponding to the image data ($d_{ib}$) and applies the selected gray voltages to the data line $D_1$-$D_m$ as the data voltages.

The gate driver 440 applies the gate-on voltage Von to the next gate line $G_{1a}$-$G_{nb}$, for example, a lower gate line $G_{ib}$ of the i-th pixel row in response to the gate control signals CONT1, thereby turning on the switching elements Qb connected thereto. The data voltages applied to the data lines $D_1$-$D_m$ are supplied to the subpixels PXb through the activated switching elements Qb.

As described above, an input image data is converted into a pair of output image data that give different transmittances to a pair of subpixels PXa and PXb. Therefore, as shown in FIG. 7a, two subpixels PXa and PXb show different gamma curves Ta and Tb, and the gamma curve T for a pixel PX is synthesized from the gamma curves Ta and Tb.

Now, an LCD according to another embodiment of the present invention will be described in detail with reference to FIGS. 15, 16, 17A, 17B and 18.

Figure 15:
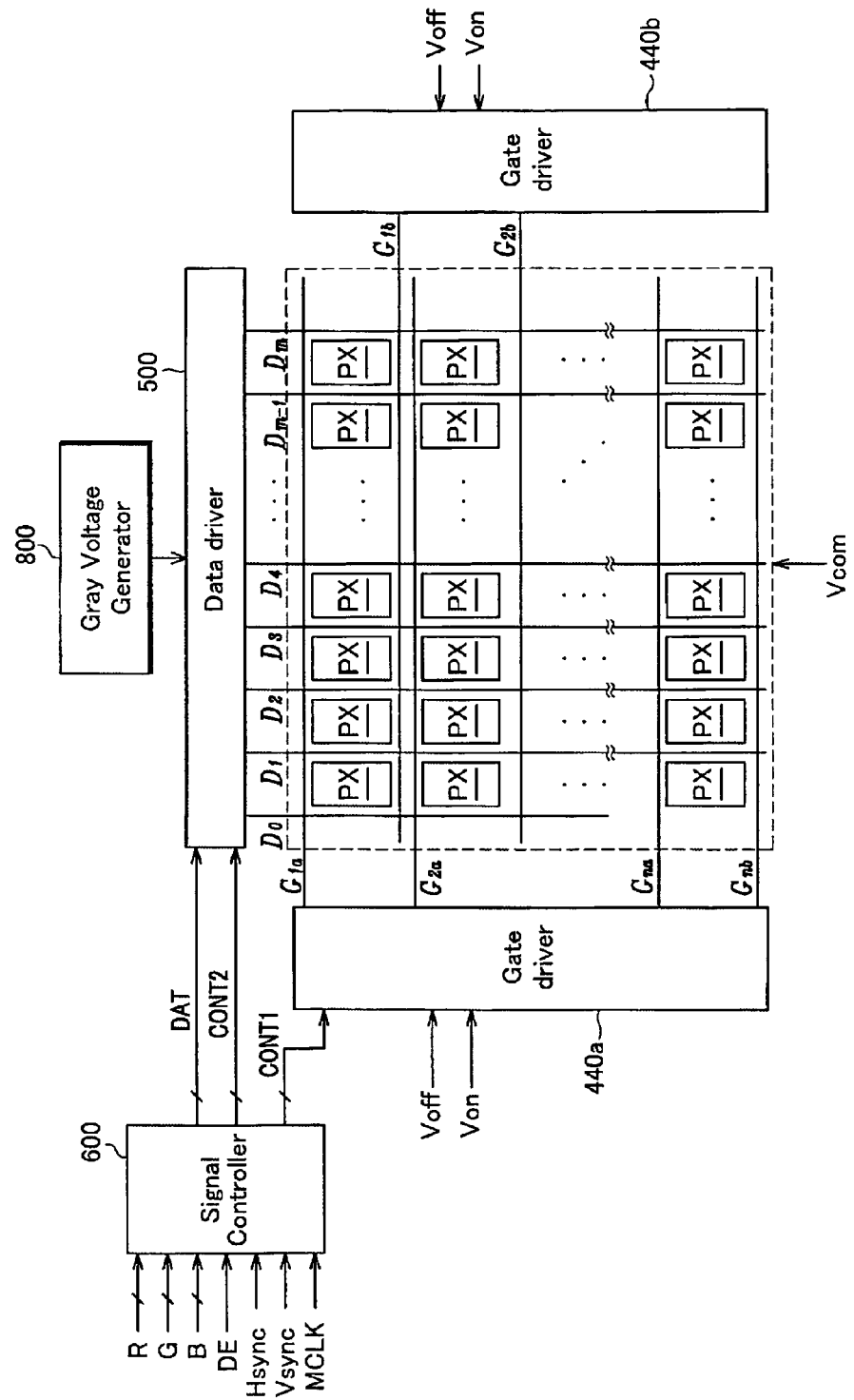
FIG. 15 is a block diagram of an LCD according to another embodiment of the present invention.
Figure 16:
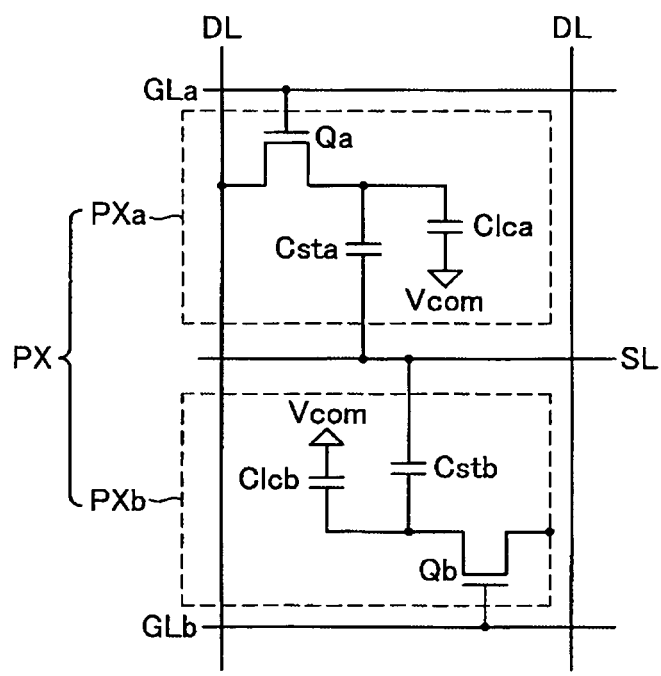
FIG. 16 is an equivalent circuit diagram of a pixel of an LCD according to another embodiment of the present invention.
Figure 17A:
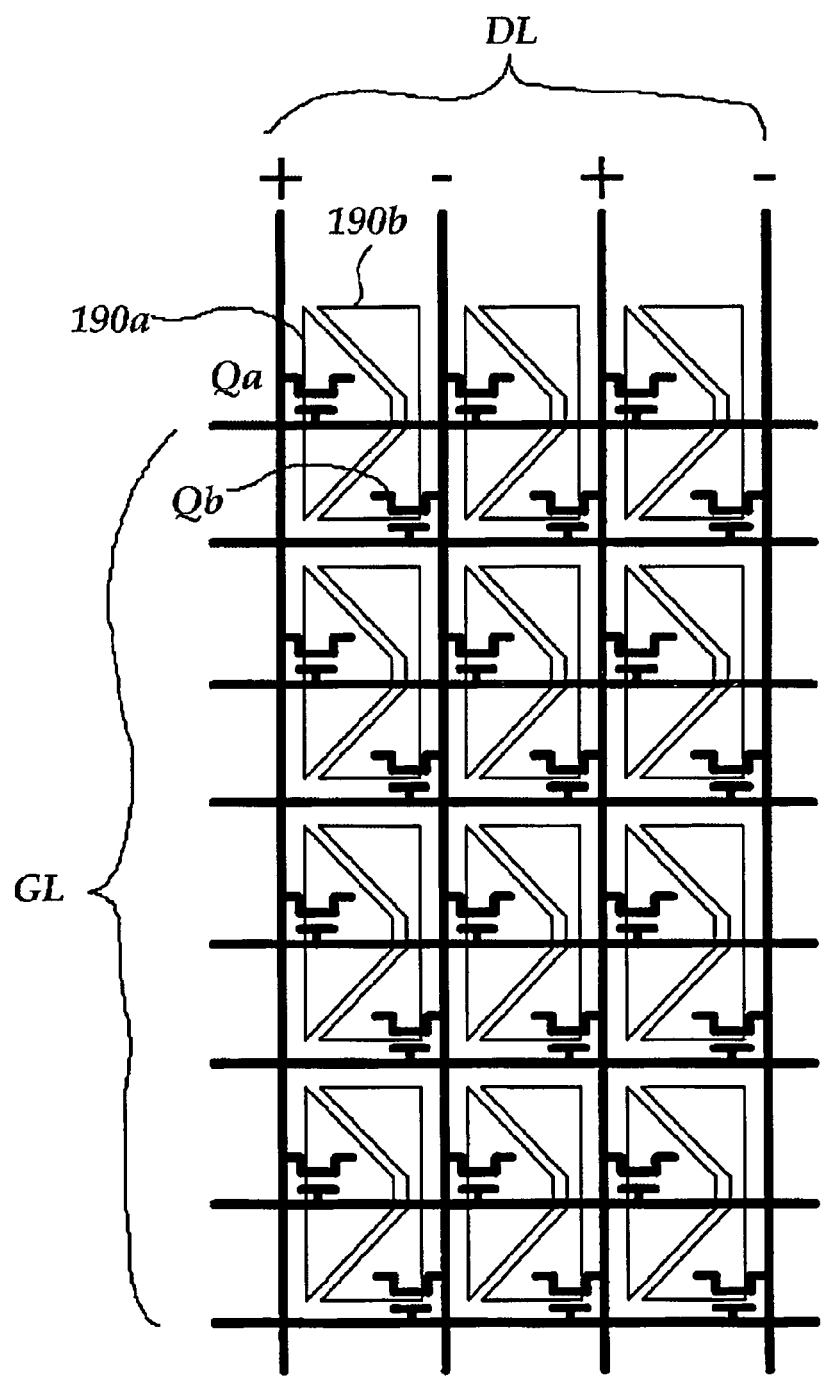
FIG. 17A schematically shows an arrangement of pixels and polarity of data voltages according to an embodiment of the present invention.
Figure 17B:
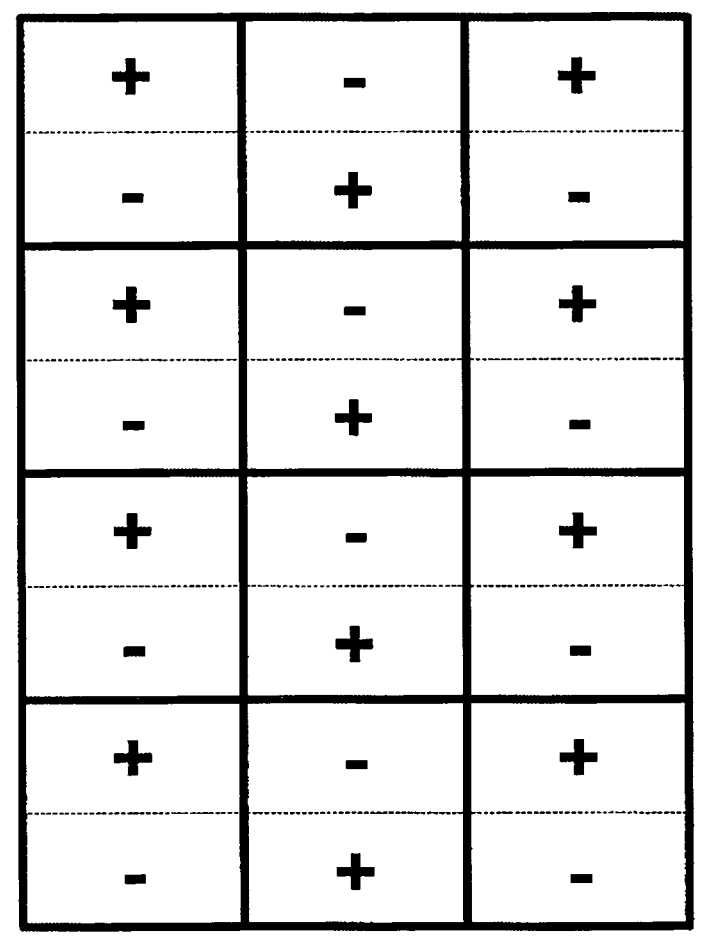
Figure 18:
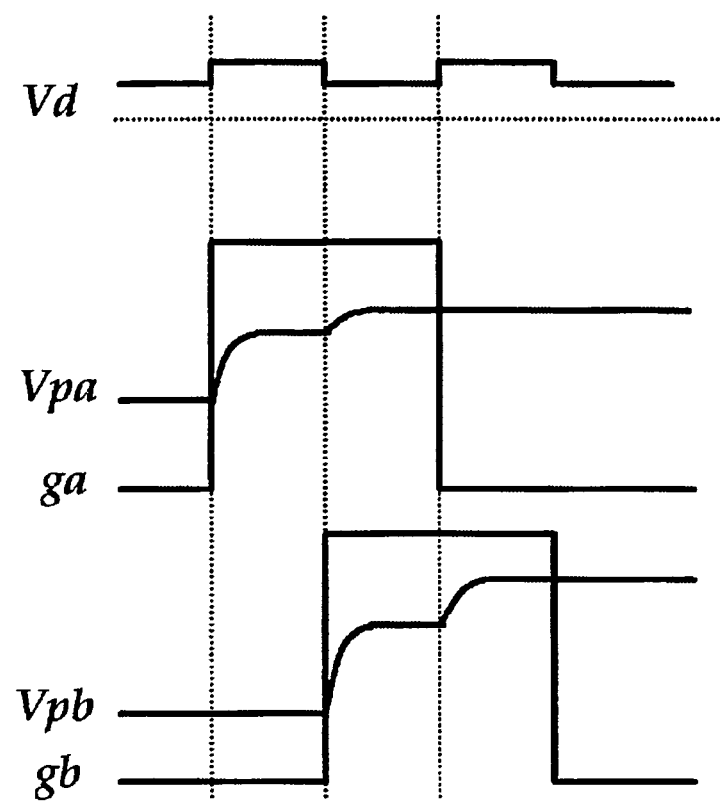
FIG. 18 shows waveforms of various signals in the LCD shown in FIG. 17A.

FIG. 15 is a block diagram of an LCD according to another embodiment of the present invention, FIG. 16 is an equivalent circuit diagram of a pixel of an LCD according to another embodiment of the present invention, FIG. 17A schematically shows an arrangement of pixels and polarity of data voltages according to an embodiment of the present invention, FIG. 17B shows polarity of subpixels in the LCD shown in FIG. 17A, and FIG. 18 shows waveforms of various signals in the LCD shown in FIG. 17A.

An LCD shown in FIGS. 15-18 has a configuration similar to the LCD shown in FIG. 3A. That is, the LCD includes a LC panel assembly 300, a pair of gate drivers 440a and 440b, a data driver 500, a gray voltage generator 800, and a signal controller 600.

Referring to FIG. 15, the panel assembly 300 includes a plurality of pairs of gate lines $G_{1a}$-$G_{nb}$, a plurality of data lines $D_0$-$D_m$, and a plurality of pixels PX. The number of the data lines $D_0$-$D_m$ is larger than the LCD shown in FIG. 3A by one.

Referring to FIGS. 16 and 17A, each pixel PX includes a pair of subpixels PXa and PXb. One subpixel PXa (referred to as a first subpixel hereinafter) includes a switching element Qa connected to an upper gate line and a left data line, a LC capacitor Clca connected to the switching element Qa, and a storage capacitor Csta connected to the switching element Qa. A subpixel electrode 190a forming the LC capacitor Clca is triangular.

The other subpixel PXb (referred to as a second subpixel hereinafter) includes a switching element Qb connected to a lower gate line and a right data line, a LC capacitor Clcb connected to the switching element Qb, and a storage capacitor Cstb connected to the switching element Qb. A subpixel electrode 190b forming the LC capacitor Clcb is spaced apart from the subpixel electrode 190a of the first subpixel PXa by a predetermined gap and the subpixel electrodes 190a and 190b substantially form a rectangle.

The inversion type is a column inversion that makes the polarity of the first subpixel PXa opposite the polarity of the second subpixel in each pixel PX as shown in FIG. 17A. The first subpixels PXa in two adjacent pixels PX in a column have the same polarity, while the second subpixels PXb in two adjacent pixels PX in a row have opposite polarities.

Referring to FIG. 18, a precharging that overlaps the application of gate signals (ga and gb) to two adjacent gate lines is performed for compensating for the lack of the charging time caused by the doubled number of the gate lines. Referring to the connection shown in FIG. 17A, the first subpixel PXa is precharged with a data voltage for the second subpixel PXb of a left pixel PX in an upper pixel row, and the second subpixel PXb is precharged with a data voltage of the first subpixel PXa of a right pixel PX. The precharging is relatively easy in the column inversion as compared with a dot inversion that reverses the polarity of the data voltages flowing in a data line. In FIG. 18, reference character Vd denotes data voltages applied to a predetermined data line, reference character Vpa denotes a voltage of the first subpixel, and reference character Vpb denotes a voltage of the second subpixel.

When the subpixels of a pixel are connected to different data lines and the data driver 500 performs a column inversion as described above, the type of the apparent inversion in view of subpixel is a dot inversion. Accordingly, the LCD has the advantages of both the column inversion and the dot inversion.

In addition, since the pixels have the same shape, the image quality is increased.

Now, an LC panel assembly according to an embodiment of the present invention will be described in detail with reference to FIGS. 19, 20, 21, 22, 23 and 24.

Figure 19:
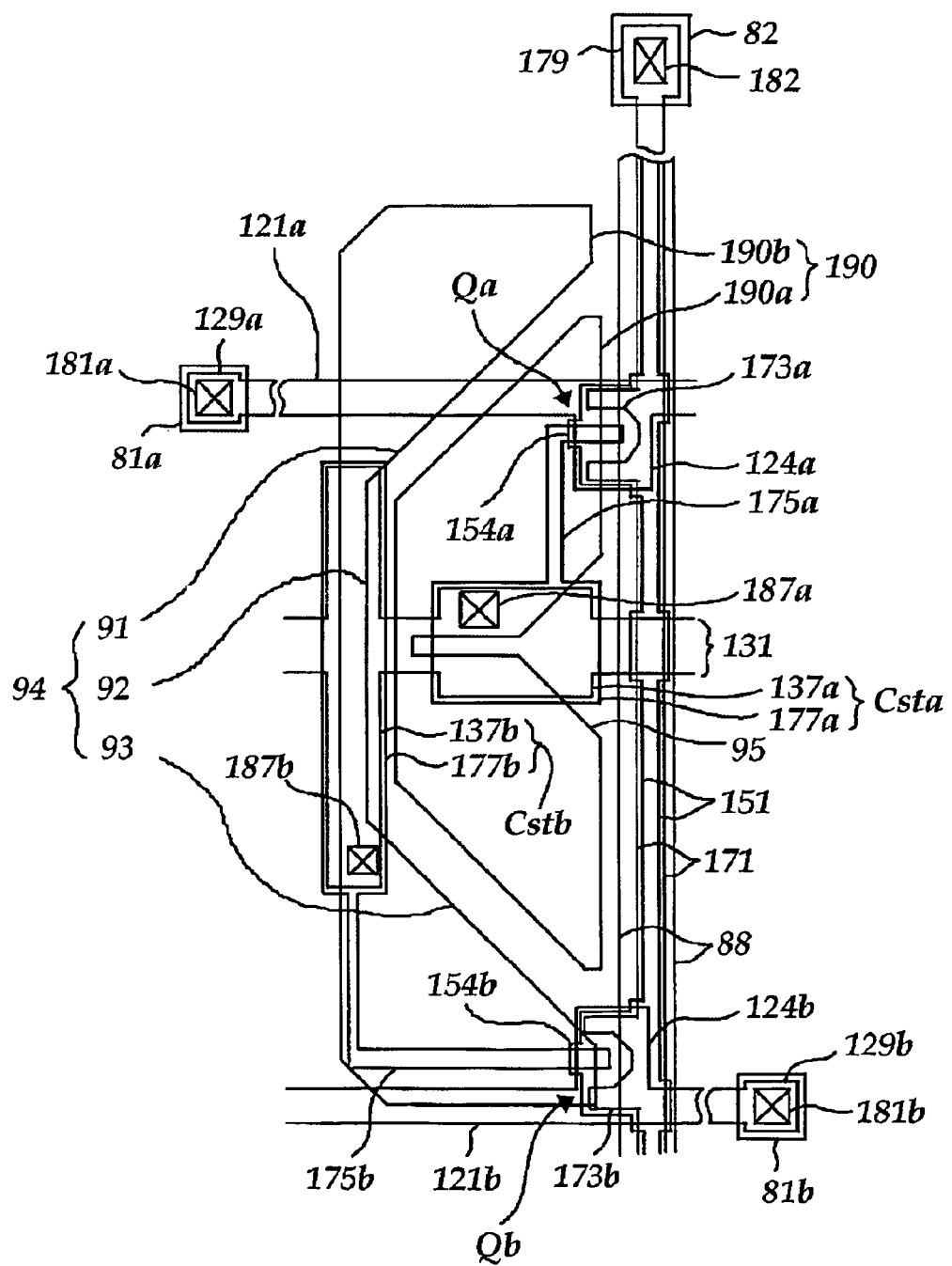
FIG. 19 is a layout view of a lower panel (TFT array panel) according to an embodiment of the present invention.
Figure 20:
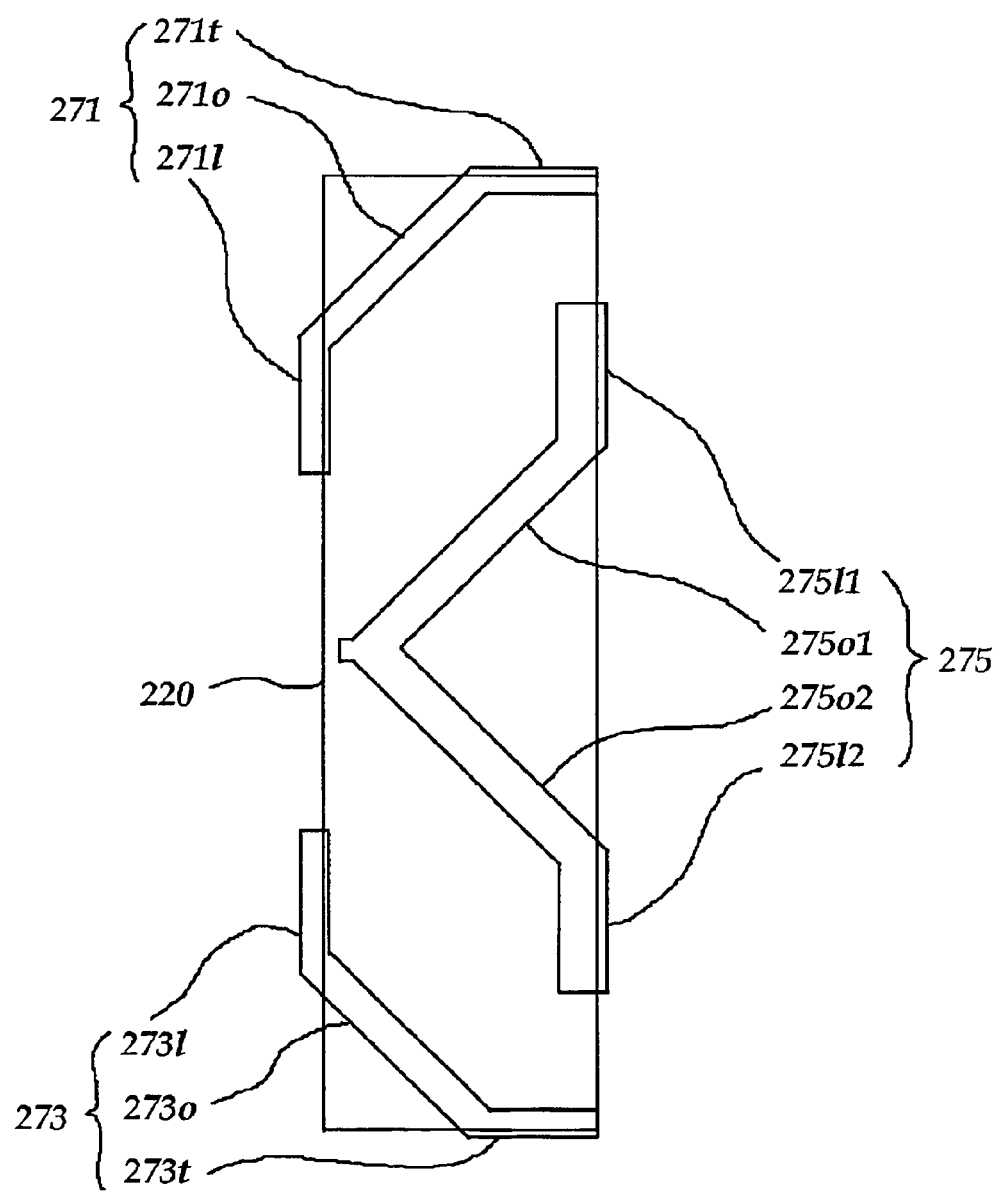
FIG. 20 is a layout view of an upper panel (common electrode panel) according to an embodiment of the present invention.
Figure 21:
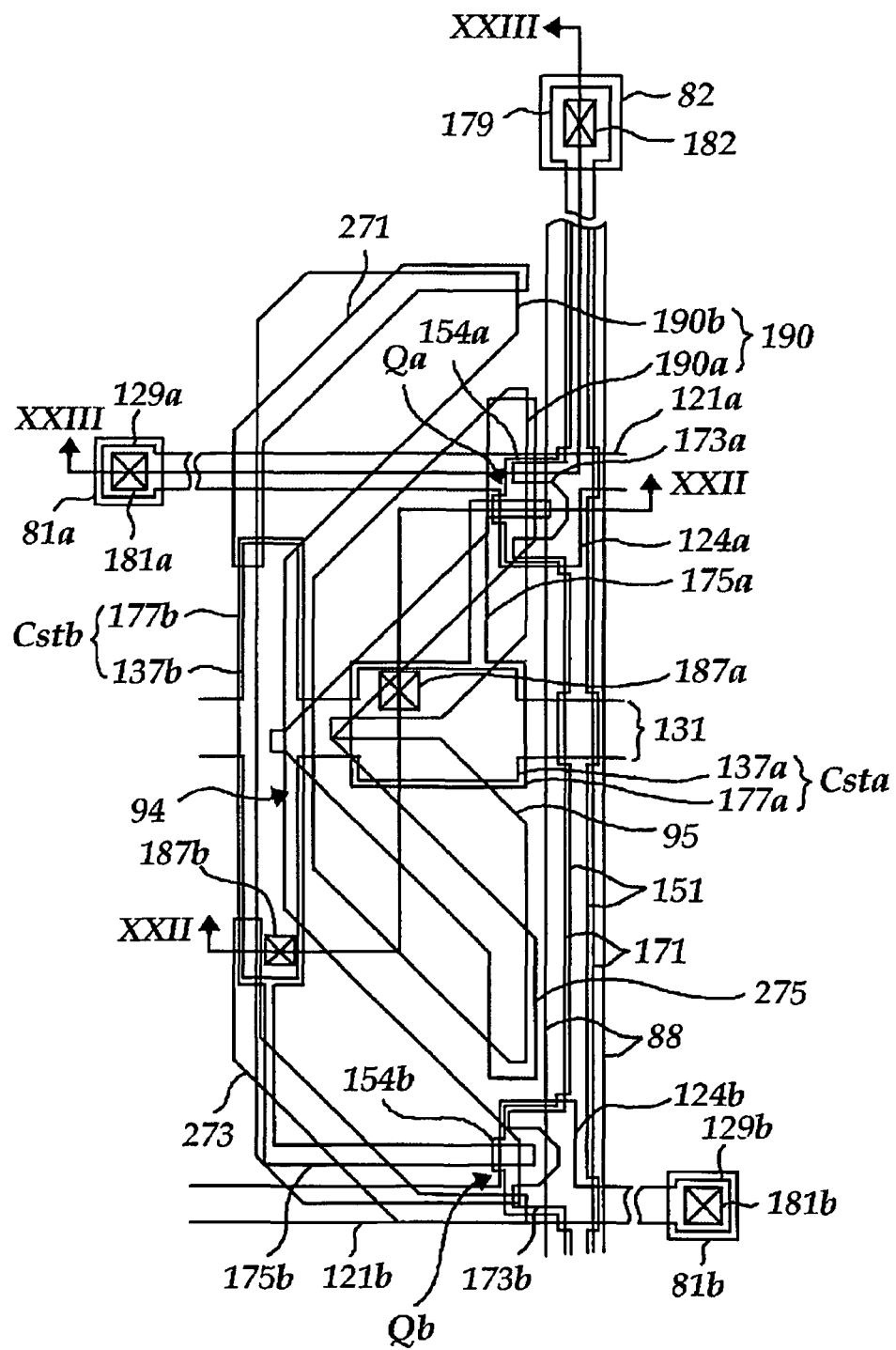
FIG. 21 is a layout view of an LC panel assembly including the TFT array panel shown in FIG. 19 and the common electrode panel shown in FIG. 20.
Figure 22:
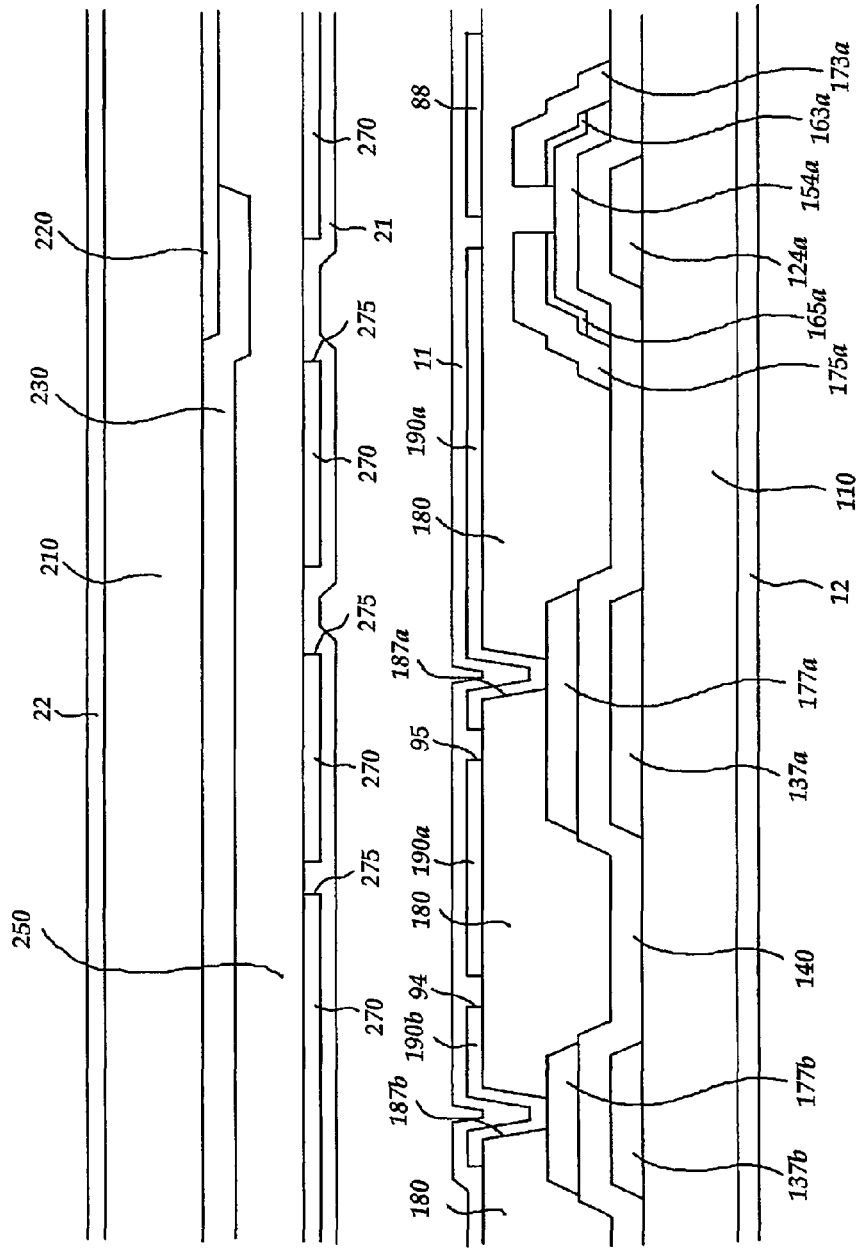
FIGS. 22 and 23 are sectional views of the LC panel assembly shown in FIG. 21 taken along lines XXII-XXII and XXIII-XXIII, respectively.
Figure 23:
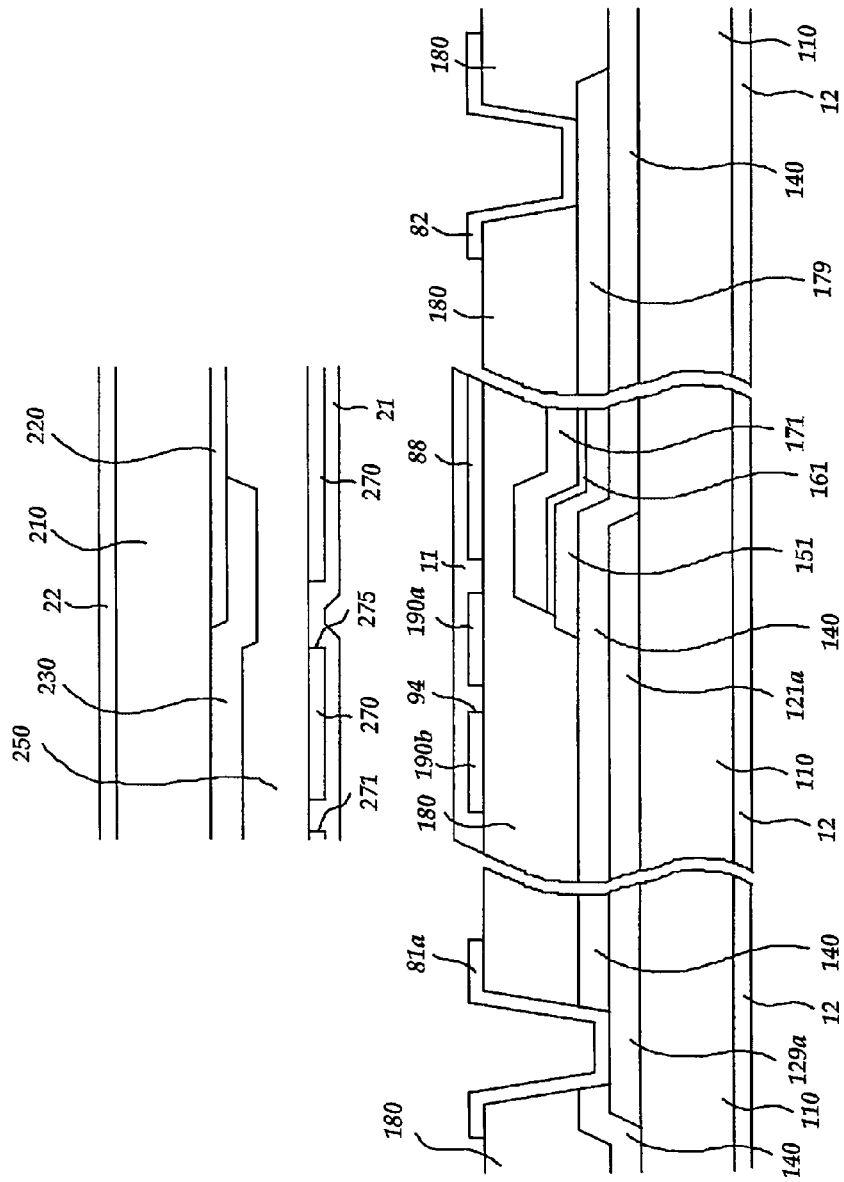
Figure 24:
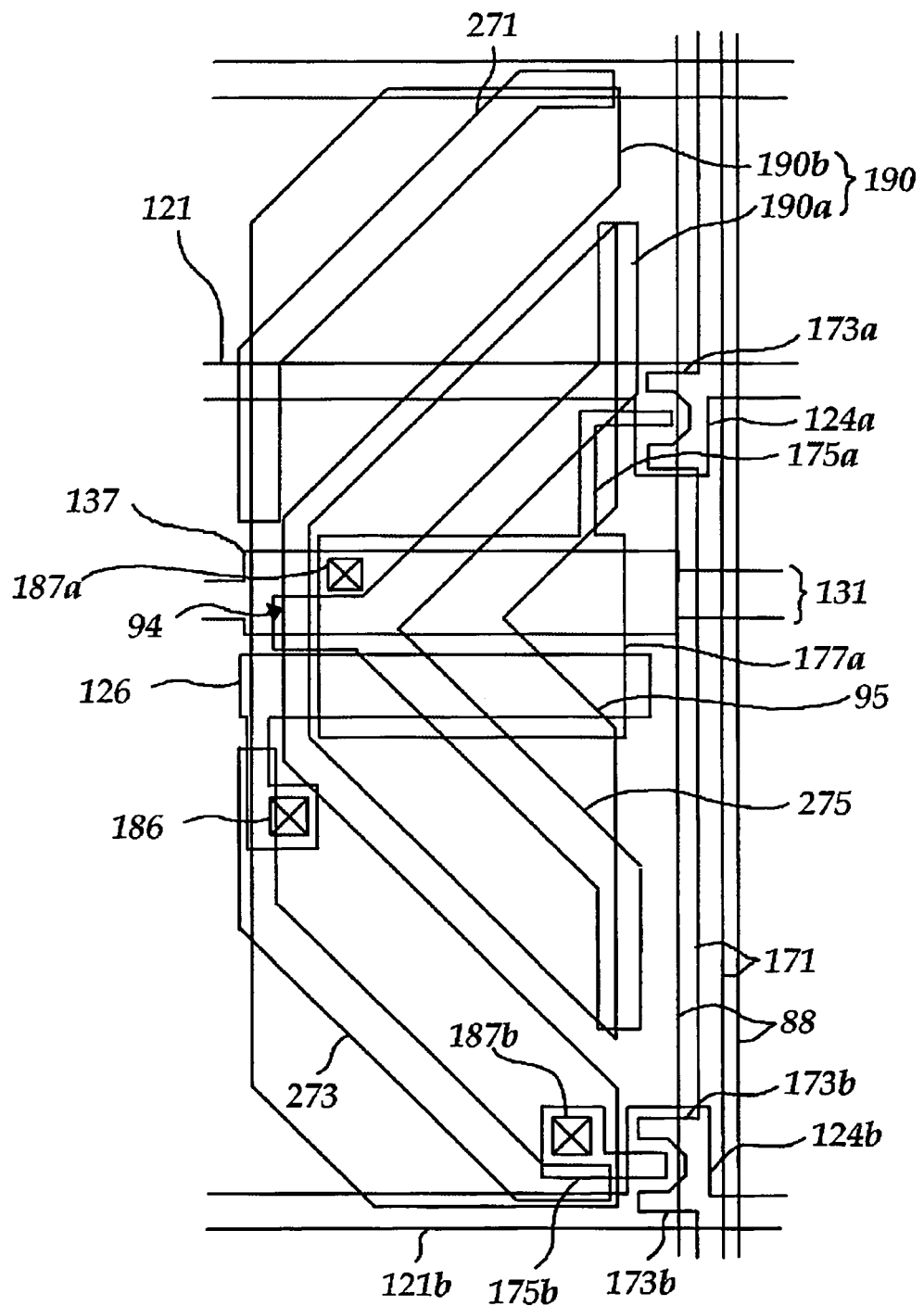
FIG. 24 is a layout view of a TFT array panel according to another embodiment of the present invention.

FIG. 19 is a layout view of a lower panel (TFT array panel) according to an embodiment of the present invention, FIG. 20 is a layout view of an upper panel (common electrode panel) according to an embodiment of the present invention, FIG. 21 is a layout view of an LC panel assembly including the TFT array panel shown in FIG. 19 and the common electrode panel shown in FIG. 20, FIGS. 22 and 23 are sectional views of the LC panel assembly shown in FIG. 21 taken along lines XXII-XXII and XXIII-XXIII, respectively, and FIG. 24 is a layout view of a TFT array panel according to another embodiment of the present invention.

FIGS. 19-23 is an example of the LC panel assembly of the LCD shown in FIG. 4A, and FIG. 24 is an example of the LC panel assembly of the LCD shown in FIG. 4B. The description focuses on the panel assembly shown in FIGS. 19 and 23, and the distinct features of the panel assembly shown in FIG. 24 is also described.

Referring to FIGS. 19-23, an LC panel assembly according to an embodiment of the present invention includes a TFT array panel 100, a common electrode panel 200 facing the TFT array panel 100, and a liquid crystal layer 3 interposed between the panels 100 and 200.

First, the TFT array panel 100 will be described with reference to FIGS. 19, 21-23 and 24.

A plurality of pairs of first and second gate lines 121a and 121b and a plurality of storage electrode lines 131 are formed on an insulating substrate 110 such as transparent glass or plastic. In case of FIG. 24, a plurality of coupling electrodes 126 are also formed on the substrate 110.

The gate lines 121a and 121b transmit gate signals, extend substantially in a transverse direction, and are physically and electrically separated from one another. The pair of first and second gate lines 121a and 121b are disposed at relatively upper and lower positions, respectively, and include a plurality of gate electrodes 124a and 124b projecting toward downward and upward. Each of the gate lines 121a and 121b further includes an end portion 129a and 129b having a large area for contact with another layer or an external driving circuit and disposed left and right sides of the substrate 110. However, the positions of both the end portions 129a and 129b may be left or right side of the substrate 110. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121a and 121b may extend to be connected to a driving circuit that may be integrated on the substrate 110.

The storage electrode lines 131 are supplied with a predetermined voltage such as the common voltage Vcom and each of the storage electrode lines 131 includes a stem extending substantially parallel to the gate lines 121a and 121b and a plurality of pairs of first and second storage electrodes 137a and 137b. Each of the storage electrode lines 131 is disposed between first and second gate lines 121a and 121b and it is closer to the first gate line 121a than the second gate line 121b.

The first storage electrodes 137a are longer and narrower than the second storage electrodes 137b. However, the storage electrode line 131 shown in FIG. 24 includes only one storage electrode 137 corresponding to the first storage electrode 137a. The storage electrode lines 131 may have various shapes and arrangements.

The capacitive electrodes 126 shown in FIG. 24 are adjacent to the storage electrodes 137 and extend substantially parallel to the storage electrodes 137. The capacitive electrodes 126 include projections projecting downward for the contact with other layers.

The gate lines 121a and 121b and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the two films is preferably made of low resistivity metal including Al containing metal, Ag containing metal, and Cu containing metal for reducing signal delay or voltage drop. The other film is preferably made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate lines 121a and 121b and the storage electrode lines 131 may be made of various metals or conductors.

The lateral sides of the gate lines 121a and 121b and the storage electrode lines 131 are inclined relative to a surface of the substrate, and the inclination angle thereof ranges about 30-80 degrees.

A gate insulating layer 140 preferably made of silicon nitride (SiNx) or silicon oxide (SiOx) is formed on the gate lines 121a and 121b and the storage electrode lines 131.

A plurality of semiconductor stripes 151 preferably made of hydrogenated amorphous silicon (abbreviated to "a-Si") or polysilicon are formed on the gate insulating layer 140. Each of the semiconductor stripes 151 extends substantially in the longitudinal direction and includes a plurality of first and second projections 154a and 154b branched out toward the first and the second gate electrodes 124a and 124b, respectively. The semiconductor stripes 151 extend substantially in the longitudinal direction and become wide near the gate lines 121a and 121b and the storage electrode lines 131 such that the semiconductor stripes 151 cover large areas of the gate lines 121a and 121b and the storage electrode lines 131.

A plurality of ohmic contact stripes and islands 161 and 165a are formed on the semiconductor stripes 151. The ohmic contact stripes and islands 161 and 165a are preferably made of n+ hydrogenated a-Si heavily doped with n type impurity such as phosphorous or they may be made of silicide. Each ohmic contact stripe 161 includes a plurality of projections 163a, and the projections 163a and the ohmic contact islands 165a are located in pairs on the first projections 154a of the semiconductor stripes 151.

Although it is not shown in the figures, a plurality of pairs of projections (not shown) of the semiconductor stripes 151 and semiconductor islands (not shown) are disposed in pairs on the second projections 154b of the semiconductor stripes 151.

The lateral sides of the semiconductor stripes 151 and the ohmic contacts 161 and 165a are inclined relative to the surface of the substrate 110, and the inclination angles thereof are preferably in a range of about 30-80 degrees.

A plurality of data lines 171 and a plurality of pairs of first and second drain electrodes 175a and 175b are formed on the ohmic contacts 161 and 165a and the gate insulating layer 140.

The data lines 171 transmit data signals and extend substantially in the longitudinal direction to intersect the gate lines 121a and 121b and the storage connections 135a and 135b. Each data line 171 includes a plurality of first and second source electrodes 173a and 173b projecting toward the first and the second gate electrodes 124a and 124b, respectively, and curved like a character C and. Each of the data lines 171 further includes an end portion 179 having a large area for contact with another layer or an external driving circuit. A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a driving circuit that may be integrated on the substrate 110.

The first and the second drain electrodes 175a and 175b are separated from the data lines 171 and disposed opposite the first and the second source electrodes 173a and 173b with respect to the first and the second gate electrodes 124a and 124b. Each of the first and the second drain electrodes 175a and 175b includes a wide end portion 177a or 177b and a narrow end portion. The wide end portion 177a or 177b overlaps first and second storage electrode 137a and 137b and the narrow end portion is disposed on the first or the second projection 154a or 154b and partly enclosed by a first or the second source electrode 173a or 173b.

However, the second drain electrodes 175b shown in FIG. 24 are not relatively short and the first drain electrodes 175a overlap the storage electrodes 137 and the coupling electrodes.

A gate electrode 124a/124b, a source electrode 173a/173b, and a drain electrode 175a/175b along with a semiconductor island 154a/154b form a TFT Qa and Qb having a channel formed in the semiconductor island 154a/154b disposed between the source electrode 173a/173b and the drain electrode 175a/175b.

The data lines 171 and the drain electrodes 175a and 175b are preferably made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data lines 171 and the drain electrodes 175a and 175b may be made of various metals or conductors.

The data lines 171 and the drain electrodes 175a and 175b have inclined edge profiles, and the inclination angles thereof range about 30-80 degrees.

The ohmic contacts 162, 163a and 165a are interposed only between the underlying semiconductor islands 152, 154a and 154b and the overlying conductors 171, 175a and 175b thereon and reduce the contact resistance therebetween. Although the semiconductor stripes 151 are narrower than the data lines 171 at most places, the width of the semiconductor stripes 151 becomes large near the gate lines 121a and 121b and the storage electrode lines 131 as described above, to smooth the profile of the surface, thereby preventing the disconnection of the data lines 171. The semiconductor stripes 151 include some exposed portions, which are not covered with the data lines 171 and the drain electrodes 175a and 175b, such as portions located between the source electrodes 173 and the drain electrodes 175a and 175b.

A passivation layer 180 is formed on the data lines 171, the drain electrodes 175a and 175b, and the exposed portions of the semiconductor stripes 151. The passivation layer 180 is preferably made of inorganic or organic insulator and it may have a flat top surface. Examples of the inorganic insulator include silicon nitride and silicon oxide. The organic insulator may have photosensitivity and dielectric constant less than about 4.0. The passivation layer 180 may include a lower film of inorganic insulator and an upper film of organic insulator such that it takes the excellent insulating characteristics of the organic insulator while preventing the exposed portions of the semiconductor islands 152, 154a and 154b from being damaged by the organic insulator.

The passivation layer 180 has a plurality of contact holes 182, 187a and 187b exposing the end portions 179 of the data lines 171 and the drain electrodes 175a and 175b, respectively. The passivation layer 180 and the gate insulating layer 140 have a plurality of contact holes 181a and 181b exposing the end portions 129a and 129b of the gate lines 121a and 121b. In FIG. 24, the passivation layer 180 and the gate insulating layer 140 further have a plurality of contact holes 186 exposing the end portions of the coupling electrodes 126.

A plurality of pixel electrodes 190 including first and second subpixel electrodes 190a and 190b, a shielding electrode 88, and a plurality of contact assistants 81a, 81b and 82 are formed on the passivation layer 180. They are preferably made of transparent conductor such as ITO or IZO or reflective conductor such as Ag, Al, Cr, or alloys thereof.

The first/second subpixel electrode 190a/190b is physically and electrically connected to the first/second drain electrodes 175a/175b through the contact holes 185a/185b such that the subpixel electrode 190a/190b receives data voltages from the first/second drain electrodes 175a/175b. In FIG. 24, the second subpixel electrode 190b is coupled to a coupling electrode 126 through a contact hole 186, and the first subpixel electrode 190a overlaps the coupling electrode 126.

The subpixel electrodes 190a and 190b supplied with the data voltages generate electric fields in cooperation with a common electrode 270 of the common electrode panel 270 supplied with a common voltage, which determine the orientations of liquid crystal molecules (not shown) of the liquid crystal layer 3 disposed between the two electrodes 190 and 270. A subpixel electrode 190a/190b and the common electrode 270 form a LC capacitor Clca/Clcb, which stores applied voltages after the TFT turns off. Storage capacitors Csta and Cstb for enhancing the charge storing capacity are formed by overlapping the first and the second subpixel electrodes 190a and 190b and the drain electrodes 175a and 175b with the first and the second storage electrodes 137a and 137b, etc.

Each pixel electrode 190 is chamfered at left corners and the chamfered edges of the pixel electrode 190 make an angle of about 45 degrees with the gate lines 121.

Each of the pixel electrodes 190 includes a pair of first and second subpixel electrodes 190a and 190b spaced apart from each other with interposing a gap 194, and has a shape of rectangle. The first subpixel electrode 190a is a rotated isosceles trapezoid and has a left edge disposed near a second storage electrode 137b, a right edge disposed opposite the left edge, and upper and lower oblique edges making an angle of about 45 degrees with the gate lines 121a and 121b. The second subpixel electrode 190b includes a pair of trapezoids facing the oblique edges of the first subpixel electrode 190a and a longitudinal portion facing the left edge of the first subpixel electrode 190a.

Accordingly, the gap 94 between the first subpixel electrode 190a and the second subpixel electrode 190b substantially have a uniform width, and includes upper and lower oblique portions 91 and 93 making an angle of about 45 degrees with the gate lines 121a, 121b and a longitudinal portion 92 substantially having a uniform width.

The first sub-pixel electrode 190a has a cutout 95 extending along a storage electrode line 131 and bisecting the first sub-pixel electrode 190a into upper and lower partitions by the cutout 95. The cutout 95 has an inlet from the right edge of the pixel electrode 190, and the inlet has a pair of inclined edges substantially parallel to the upper oblique portion 91 and the lower oblique portion 93 of the gap 94, respectively. The gap 94 and the cutout 95 have an inversion symmetry with respect to the storage electrode line 131.

The number of the cutouts or the number of the partitions is varied depending on the design factors such as the size of the pixel electrode 190, the ratio of the transverse edges and the longitudinal edges of the pixel electrode 190, the type and characteristics of the liquid crystal layer 3, and so on.

For descriptive convenience, the gap 94 is referred to as a cutout hereinafter.

In addition, the first subpixel electrode 190a overlaps a first gate line 121a and the second subpixel electrode 190b overlaps both of first and second gate lines 121a and 121b. The first gate line 121a passes through a center of an upper half of the pixel electrode 190.

The shielding electrode 88 extends along the data lines 171 and fully covers the data lines 171. The shielding electrode 88 is supplied with the common voltage that is applied through a contact hole provided at the passivation layer 180 and the gate insulating layer 140 or supplied from a short-circuit point (not shown) transmitting the common voltage from the TFT array panel 100 to the common electrode panel 200. At this time, it is preferable that the distance between the shielding electrode 88 and the pixel electrodes 190 is minimized to minimize the decrease of the aperture ratio.

The shielding electrode 88 blocks electromagnetic interference between the data lines 171 and the pixel electrodes 190 and between the data lines 171 and the common electrode 270 to reduce the distortion of the voltage of the pixel electrodes 190 and the signal delay of the data voltages carried by the data lines 171.

Furthermore, since the pixel electrodes 190 are required to be spaced apart from the shielding electrodes 88 for preventing the short therebetween, the pixel electrodes 190 become farther from the data lines 171 such that the parasitic capacitance therebetween becomes reduced. Moreover, since the permittivity of the LC layer 3 is higher than that of the passivation layer 180, the parasitic capacitance between the data lines 171 and the shielding electrodes 88 is reduced compared with that between the data lines 171 and the common electrode 270 without the shielding electrodes 88.

In addition, the distance between the pixel electrodes 190 and the shielding electrodes 88 can be uniformly maintained since they are made of the same layer and thus the parasitic capacitance therebetween can be made uniform.

The contact assistants 81a, 81b and 82 are connected to the end portions 129a and 129b of the gate lines 121a and 121b and the end portions 179 of the data lines 171 through the contact holes 181a, 181b and 182, respectively. The contact assistants 81a, 81b and 82 protect the end portions 129a, 129b and 179 and enhance the adhesion between the end portions 129, 129b and 179 and external devices.

When the data driver or the data driver is integrated on the panel assembly 300, the gate lines 121a and 121b or the data lines 171 may extend to be directly connected to the driver and the contact assistants 81a, 81b and 82 are used for connecting the gate lines 121a and 121b or the data lines 171 to the drivers.

The description of the common electrode panel 200 follows with reference to FIGS. 20-24.

A light blocking member 220 referred to as a black matrix for preventing light leakage is formed on an insulating substrate 210 such as transparent glass or plastic. The light blocking member 220 has a plurality of openings that face the pixel electrodes 190 and it may have substantially the same planar shape as the pixel electrodes 190. Otherwise, the light blocking member 220 may include a plurality of rectilinear portions facing the data lines 171 on the TFT array panel 100 and a plurality of widened portions facing the TFTs Qa and Qb on the TFT array panel 100. However, the light blocking member 220 may have various shapes for blocking light leakage near the pixel electrodes 190 and the TFTs Qa and Qb.

A plurality of color filters 230 are also formed on the substrate 210 and they are disposed substantially in the areas enclosed by the light blocking member 220. The color filters 230 may extend substantially in the longitudinal direction along the pixel electrodes 190. The color filters 230 may represent one of the primary colors such as red, green and blue colors.

An overcoat 250 is formed on the color filters 230 and the light blocking member 220. The overcoat 250 is preferably made of (organic) insulator and it prevents the color filters 230 from being exposed and provides a flat surface. The overcoat 250 may be omitted.

A common electrode 270 is formed on the overcoat 250. The common electrode 270 is preferably made of transparent conductive material such as ITO and IZO and has a plurality of sets of cutouts 271, 273 and 275.

A set of cutouts 271, 273 and 275 face a pixel electrode 190 and include an upper cutout 271, a lower cutout 273, and a center cutout 275. Each of the cutouts 271, 273 and 275 is disposed between adjacent cutouts 94 and 95 of the pixel electrode 190 or between a cutout 94 and a chamfered edge of the pixel electrode 190. Each of the cutouts 271, 273 and 275 has at least an oblique portion extending substantially parallel to the upper oblique portion 91 or the lower oblique portion 93 of the gap. The cutouts 271, 273 and 275 have substantially an inversion symmetry with respect to a storage electrode line 131.

Each of the lower and upper cutouts 271 and 273 includes an oblique portion 271*o* or 273*o*, a transverse portion 271*t* or 273*t*, and a longitudinal portion 271*l* or 273*l*. The oblique portion 271*o* or 273*o* extends approximately from a left edge of the pixel electrode 190 approximately to lower or upper edge of the pixel electrode 190. Each of the transverse portion 271*t* or 273*t* and the longitudinal portion 271*l* or 273*l* extends from a respective end of the oblique portion 271*o* or 273*o* along an edge of the pixel electrode 190, overlapping the edge of the pixel electrode 190, and making an obtuse angle with the oblique portion 271*o* or 273*o*.

The center cutout 275 includes a pair of oblique portions 275*o*1 and 275*o*2 and a pair of terminal longitudinal portions 275*l*1 and 275*l*2. The oblique portions 275*o*1 and 275*o*2 extend approximately from a center of a left edge of the pixel electrode 190 approximately to the right edge of the pixel electrode 190. The terminal longitudinal portions 275*l*1 and 275*l*2 extend from the ends of the respective oblique portions 275*o*1 and 275*o*2 along the right edge of the pixel electrode 190, overlapping the right edge of the pixel electrode 190, and making obtuse angles with the respective oblique portions 275*o*1 and 275*o*2.

The number of the cutouts 271, 273 and 275 may be varied depending on the design factors, and the light blocking member 220 may also overlap the cutouts 271, 273 and 275 to block the light leakage through the cutouts 271, 273 and 275.

Alignment layers 11 and 21 that may be homeotropic are coated on inner surfaces of the panels 100 and 200.

Polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film (not shown) for compensating the retardation of the LC layer 3. The LCD may further include a backlight unit (not shown) supplying light to the LC layer 3 through the polarizers 12 and 22, the retardation film, and the panels 100 and 200.

It is preferable that the LC layer 3 has negative dielectric anisotropy and it is subjected to a vertical alignment that the LC molecules in the LC layer 3 are aligned such that their long axes are substantially vertical to the surfaces of the panels 100 and 200 in absence of electric field. Accordingly, incident light cannot pass the crossed polarization system 12 and 22.

Upon application of the common voltage to the common electrode 270 and a data voltage to a pixel electrode 190, an electric field substantially perpendicular to the surfaces of the panels 100 and 200 is generated, and both the pixel electrode 190 and the common electrode 270 are commonly referred to as "field generating electrodes" hereinafter. The LC molecules tend to change their orientations in response to the electric field such that their long axes are perpendicular to the field direction.

The cutouts 94, 95, 271, 273 and 275 of the field generating electrodes 190 and 270 and the edges of the pixel electrodes 190 distort the electric field to have a horizontal component that is substantially perpendicular to the edges of the cutouts 94, 95, 271, 273 and 275 and the edges of the pixel electrodes 190.

Accordingly, the electric field points a direction oblique to a normal of a surface of the panels 100 and 200. The liquid crystal molecules tend to reorient themselves so that their long axes may be perpendicular to the electric field. Since the electric field near the cutouts 94, 95, 271, 273 and 275 and the edges of the pixel electrode 190 is not parallel to the long axes of the LC molecules to make angles, the LC molecules rotate along a direction giving the shortest moving distance on a plane defined by the long axes of the LC molecules and the electric field.

Referring to FIG. 21, a set of the cutouts 94, 95, 271, 273 and 275 divides a pixel electrode 190 into a plurality of sub-areas and each sub-area has two primary edges making oblique angles with the major edges of the pixel electrode 190. The primary edges of the sub-areas make an angle of about 45 degrees with the polarization axes of the polarizers 12 and 22 for maximizing the light efficiency.

Since most LC molecules 31 on each sub-area tilt perpendicular to the primary edges, the azimuthal distribution of the tilt directions are localized to four directions, thereby increasing the reference viewing angle of the LCD.

The shapes and the arrangements of the cutouts 94, 95, 271, 273 and 275 may be modified.

At least one of the cutouts 94, 95, 271, 273 and 275 can be substituted with protrusions (not shown) or depressions (not shown). The protrusions are preferably made of organic or inorganic material and disposed on or under the field generating electrodes 190 or 270.

Now, an LCD according to another embodiment of the present invention will be described in detail with reference to FIGS. 25 and 26.

Figure 25:
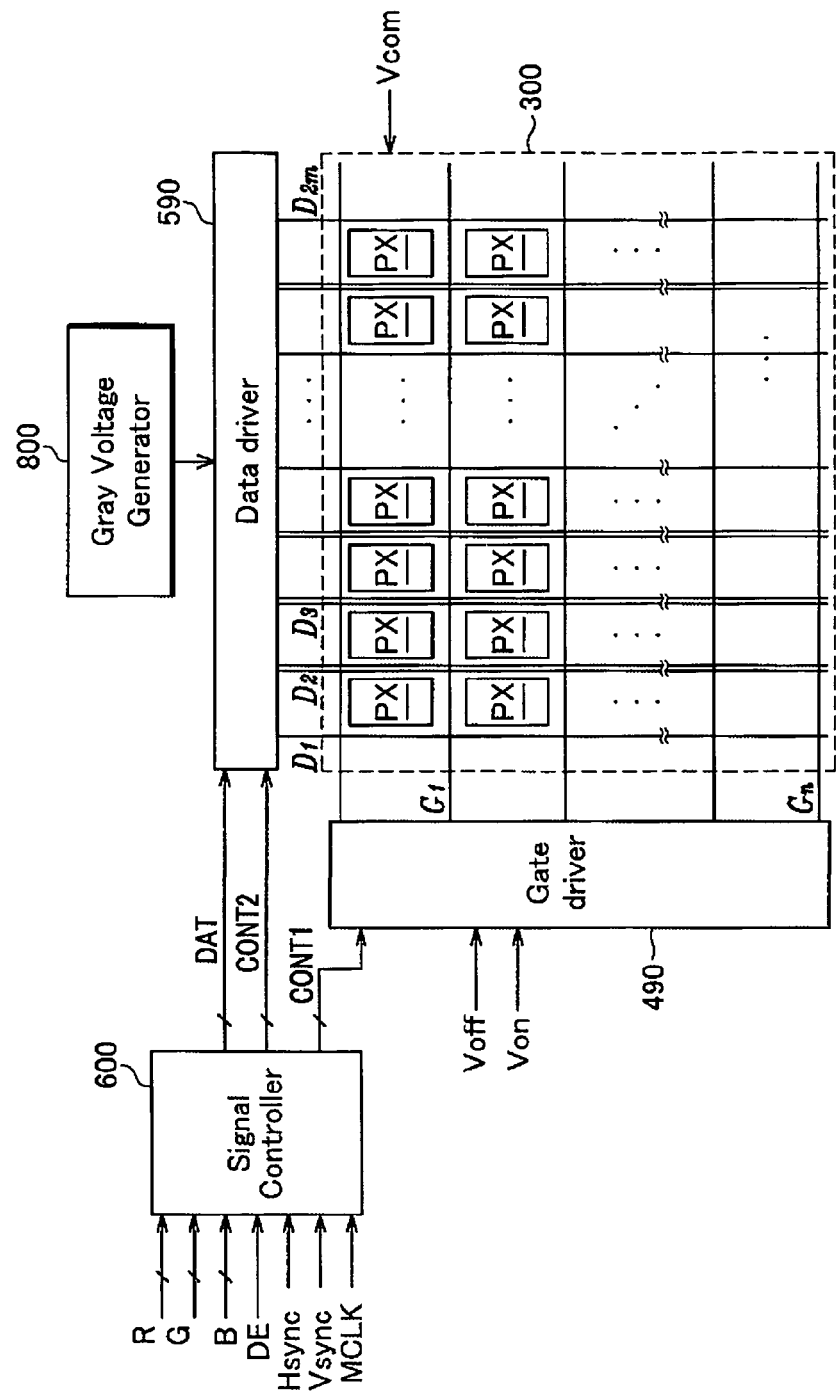
FIG. 25 is a block diagram of an LCD according to another embodiment of the present invention.
Figure 26:
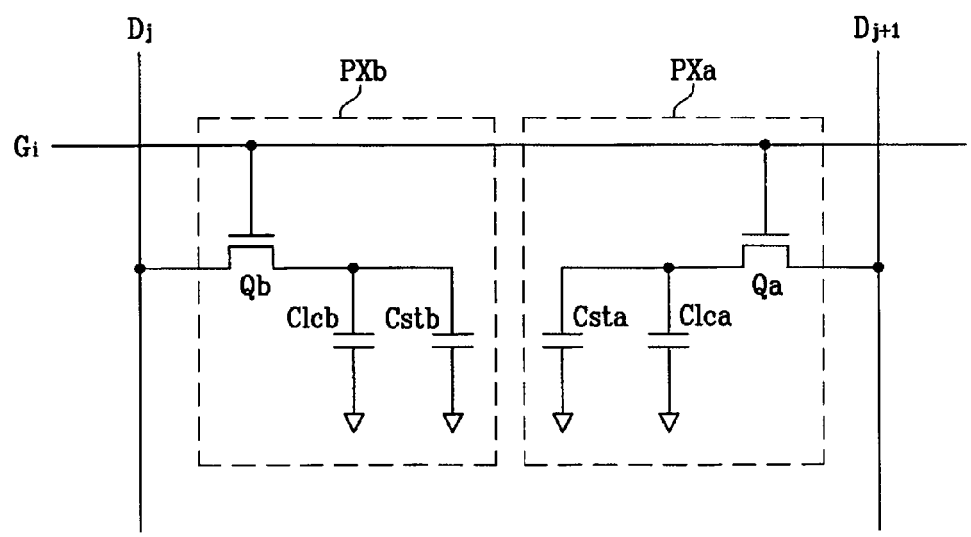
FIG. 26 is an equivalent circuit diagram of a pixel of an LCD according to another embodiment of the present invention.

FIG. 25 is a block diagram of an LCD according to another embodiment of the present invention, and FIG. 26 is an equivalent circuit diagram of a pixel of an LCD according to another embodiment of the present invention.

Referring to FIG. 25, an LCD according to an embodiment includes a LC panel assembly 300, a gate driver 490, a data driver 590, a gray voltage generator 800, and a signal controller 600.

The panel assembly 300 includes a plurality of gate lines $G_1$-$G_n$, a plurality of data lines $D_1$-$D_{2m}$, and a plurality of pixels PX. The number of the gate lines $G_1$-$G_n$ is a half of that in the previous embodiments, while the number of the data lines $D_1$-$D_{2m}$ is twice that in the previous embodiments. A pair of data lines $D_1$-$D_{2m}$, are disposed left and right sides of a pixel column.

Referring to FIGS. 25 and 26, each pixel PX includes a pair of subpixels PXa and PXb. One subpixel PXa (referred to as a first subpixel hereinafter) includes a switching element Qa connected to a gate line and a right data line, a LC capacitor Clca connected to the switching element Qa, and a storage capacitor Csta connected to the switching element Qa. The other subpixel PXb (referred to as a second subpixel hereinafter) includes a switching element Qb connected to the gate line and a left data line, a LC capacitor Clcb connected to the switching element Qb, and a storage capacitor Cstb connected to the switching element Qb.

Now, an exemplary LC panel assembly shown in FIGS. 25 and 26 will be described in detail with reference to FIGS. 27, 28, 29, 30A and 30B.

Figure 27:
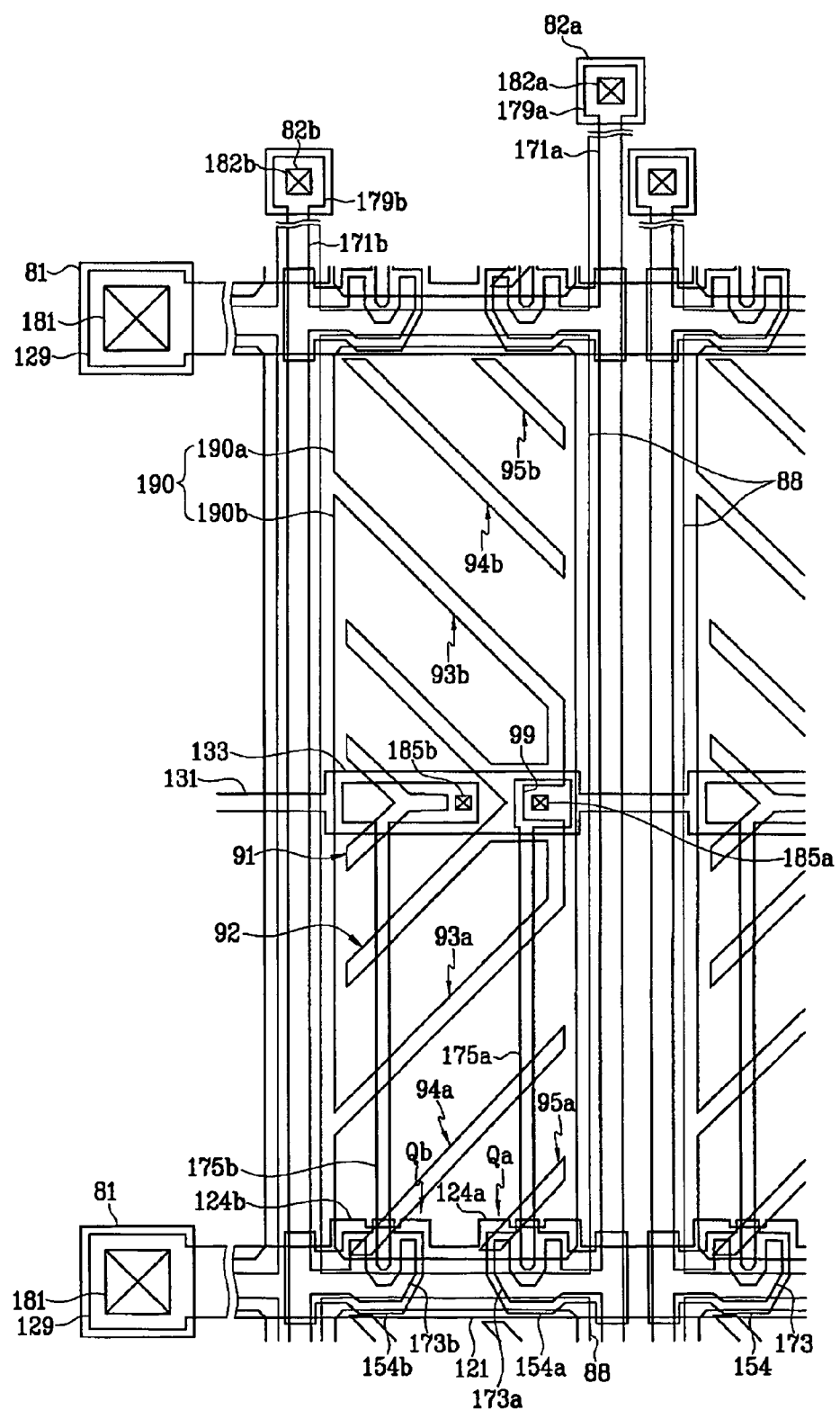
FIG. 27 is a layout view of a lower panel (TFT array panel) according to an embodiment of the present invention.
Figure 28:
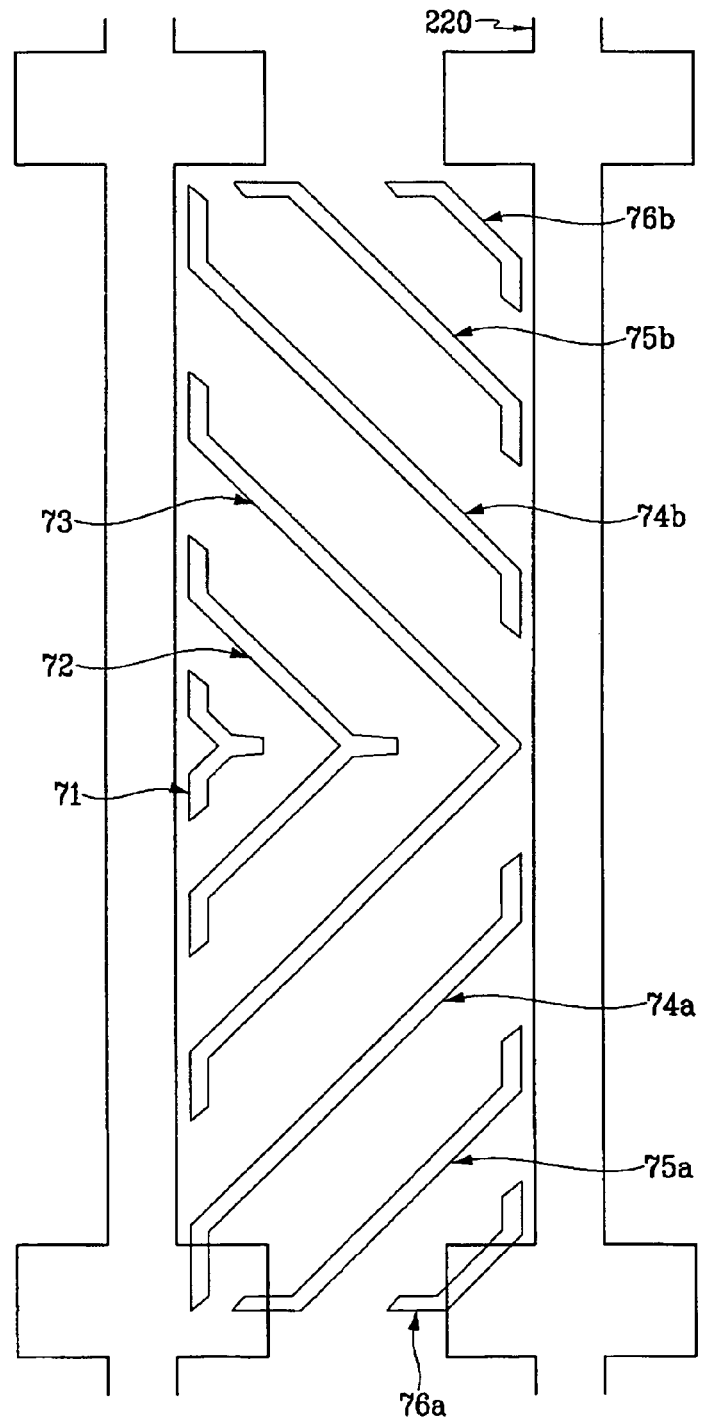
FIG. 28 is a layout view of an upper panel (common electrode panel) according to an embodiment of the present invention.
Figure 29:
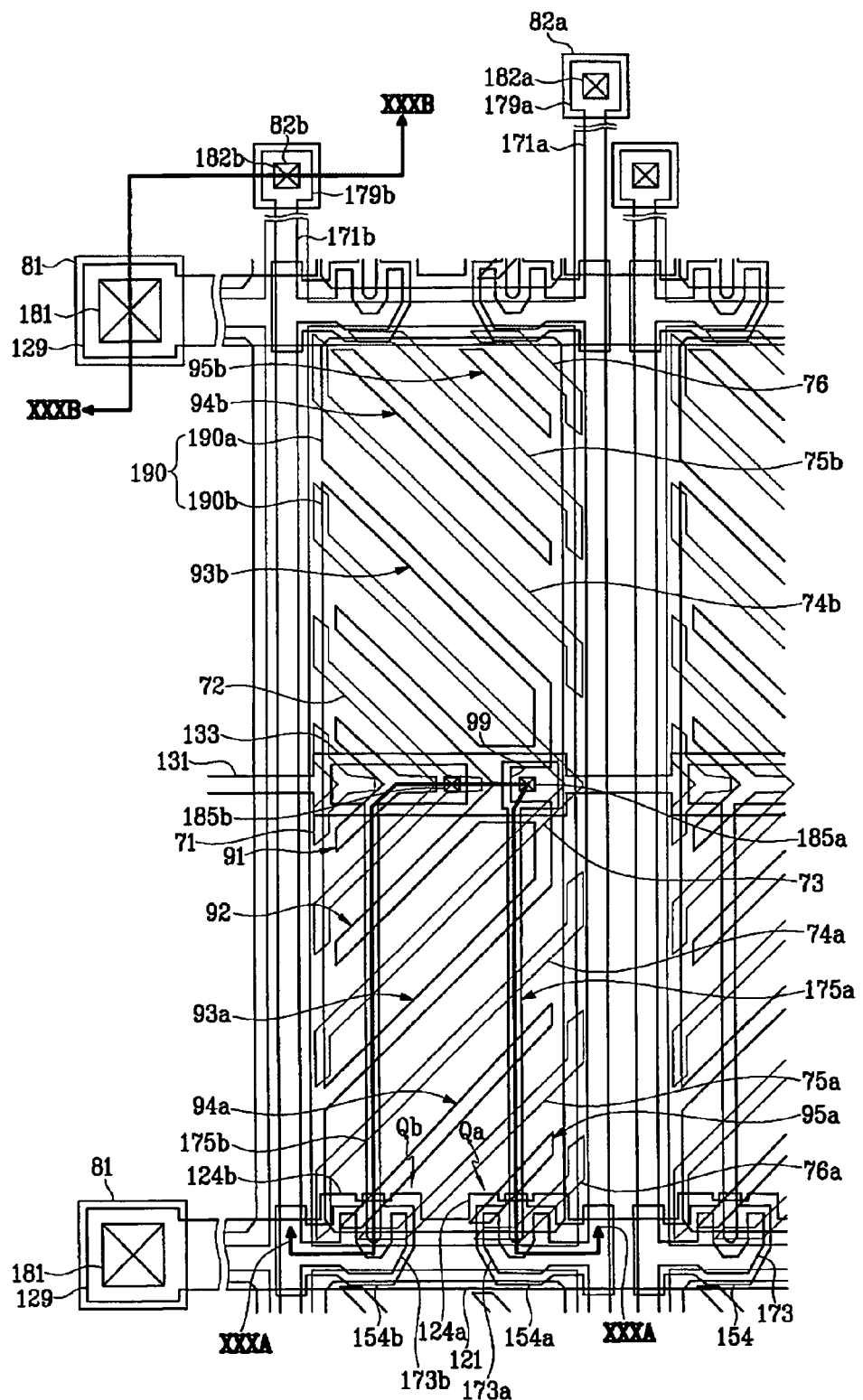
FIG. 29 is a layout view of an LC panel assembly including the TFT array panel shown in FIG. 27 and the common electrode panel shown in FIG. 28.
Figure 30A:
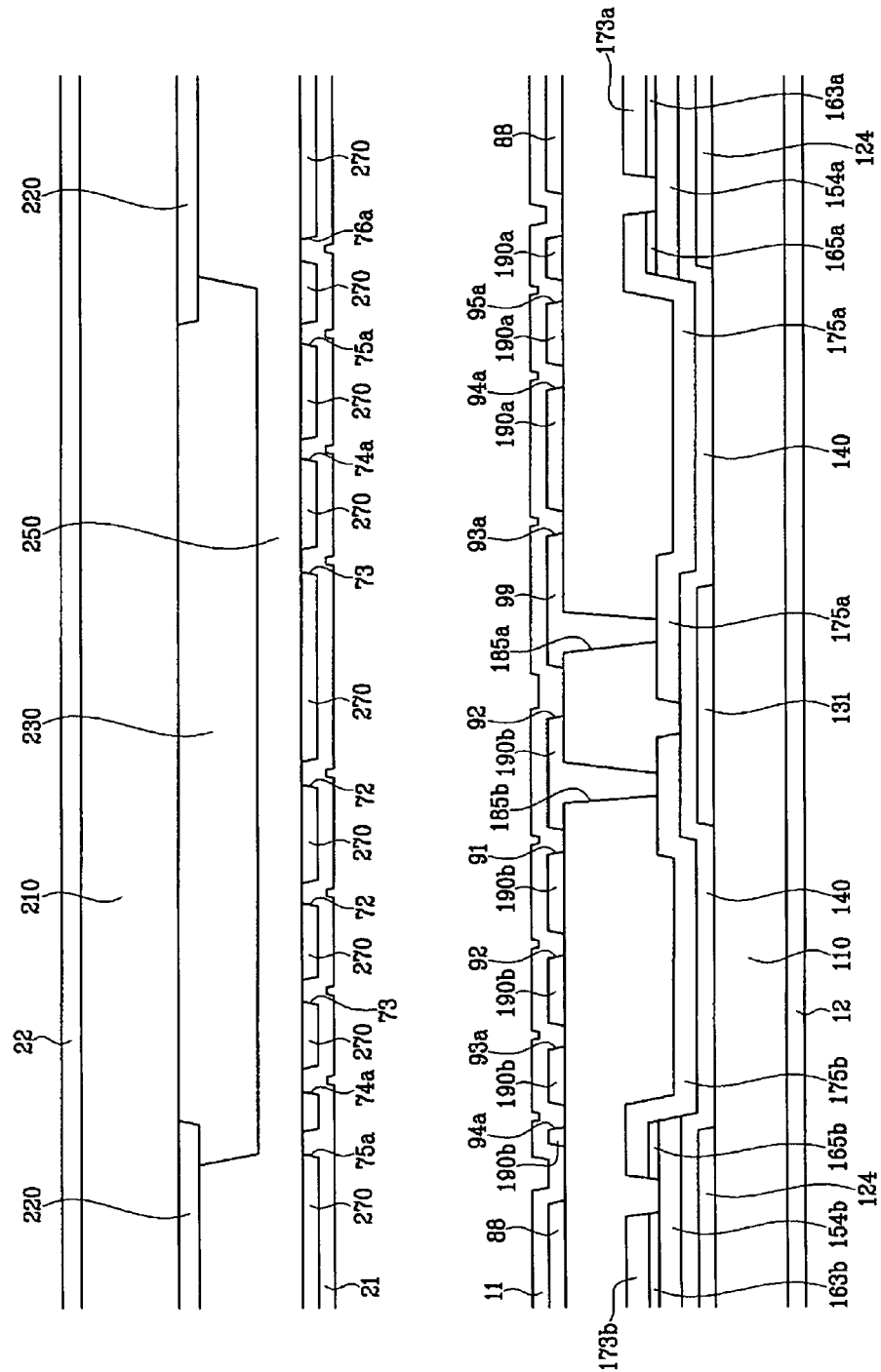
FIGS. 30A and 30B are sectional views of the LC panel assembly shown in FIG. 29 taken along lines XXXA-XXXA and XXXB-XXXB.
Figure 30B:
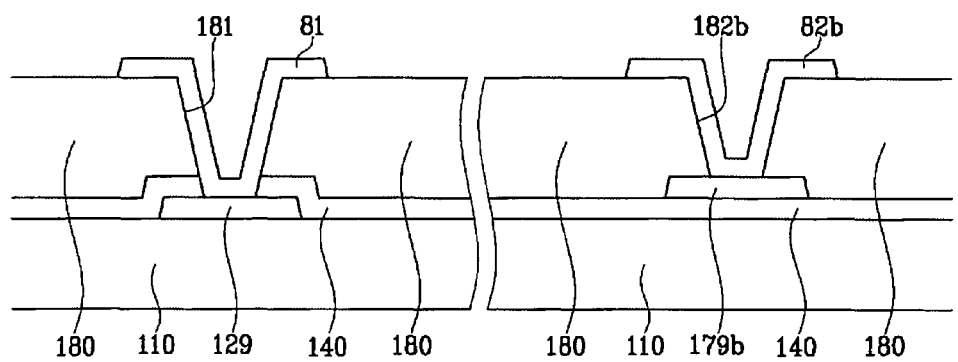

FIG. 27 is a layout view of a lower panel (TFT array panel) according to an embodiment of the present invention, FIG. 28 is a layout view of an upper panel (common electrode panel) according to an embodiment of the present invention, FIG. 29 is a layout view of an LC panel assembly including the TFT array panel shown in FIG. 27 and the common electrode panel shown in FIG. 28, and FIGS. 30A and 30B are sectional views of the LC panel assembly shown in FIG. 29 taken along lines XXXA-XXXA and XXXB-XXXB.

Referring to FIGS. 27-30B, an LC panel assembly according to an embodiment of the present invention includes a TFT array panel 100, a common electrode panel 200 facing the TFT array panel 100, and a liquid crystal layer 3 interposed between the panels 100 and 200.

First, the TFT array panel 100 will be described with reference to FIGS. 25, 30A and 30B.

A plurality of pairs of first and second gate lines 121 and a plurality of storage electrode lines 131 are formed on an insulating substrate 110 such as transparent glass, etc. Each of the gate lines 121 includes a plurality of gate electrodes 124 and a wide end portion 129. Each of the storage electrode lines 131 includes a rectangular storage electrode 133 expanding upward and downward. Each of the storage electrode lines 131 is disposed between two adjacent gate lines 121 and it is equidistant from the gate lines 121.

A gate insulating layer 140 is formed on the gate lines 121 and the storage electrode lines 131.

A plurality of semiconductor islands 154a and 154b are formed on the gate insulating layer 140 and are disposed on the gate electrodes 124.

A plurality of ohmic contact stripes and islands 163a, 163b, 165a and 165b are formed on the semiconductor islands 154a and 154b. The ohmic contacts 163a, 163b, 165a and 165b are located in pairs on the semiconductor islands 154a and 154b, and the ohmic contacts in each pair face each other with respect to a gate electrode 124.

A plurality of pairs of data lines 171a and 171b and a plurality of drain electrodes 175a and 175b are formed on the ohmic contacts 163a, 163b, 165a and 165b and the gate insulating layer 140.

Each of the data lines 171a and 171b includes U-like source electrodes 173a and 173b and a wide end portion 179a and 179b. Each of the drain electrodes 175a and 175b includes a wide end portion overlapping a storage electrode 133 and a narrow end portion. The edges of the wide end portion of the drain electrodes 175a and 175b is substantially parallel to the edges of the storage electrode 133.

A passivation layer 180 is formed on the data lines 171a and 171b, the drain electrodes 175a and 175b, and exposed portions of the semiconductor islands 154a and 154b.

The passivation layer 180 has a plurality of contact holes 182a, 182b, 185a and 185b exposing the end portions 179a and 179b of the data lines 171a and 171b and the drain electrodes 175a and 175b, respectively. The passivation layer 180 and the gate insulating layer 140 have a plurality of contact holes 181 exposing the end portions 129 of the gate lines 121.

A plurality of pixel electrodes 190 including first and second subpixel electrodes 190a and 190b, a shielding electrode 88, and a plurality of contact assistants 81, 82a and 82b are formed on the passivation layer 180.

The area of the second subpixel electrode 190b is larger than the area of the first subpixel electrode 190a, and preferably about twice the area of the first subpixel electrode 190a. Since LC molecules in the subpixel PXb subjected to a relatively low data voltage have orientations relatively close to their initial orientations such that the low-voltage LC molecules exert relatively weak effect on the twist of the lateral visibility, the increase of the subpixel electrodes 190b improves the lateral visibility. In particular, the areal ratio equal to about 2:1 much improves the lateral visibility.

A pair of first and second subpixel electrodes 190a and 190b is disposed substantially in an area enclosed by the data lines 171a and 171b and the gate lines 121 and most of the outer boundaries of the first and the second subpixel electrodes 190a and 190b are parallel to the gate lines 121 or the data lines 171a and 171b to form a rectangle. The first and the second subpixel electrodes 190a and 190b are separated from each other. The first subpixel electrode 190a includes two portions disposed at upper and lower sides of the second subpixel electrode 190b, respectively, and connected to each other through a longitudinal connection. The second subpixel electrode 190b is disposed between the two portions of the first subpixel electrode 190a.

Each of the pixel electrodes 190 is chamfered at four corners, and the chamfered edges of the pixel electrode 190 make an angle of about 45 degrees with the gate lines 121.

The pixel electrode 190 has center cutouts 91 and 92, lower cutouts 93a, 94a and 95a, and upper cutouts 93b, 94b and 95b, and the cutouts 91, 92, 93a, 93b, 94a, 94b, 95a and 95b partitions a plurality of partitions. The cutouts 91, 92, 93a, 93b, 94a, 94b, 95a and 95b has an inversion symmetry with respect to the storage electrode line 131. The first and the second subpixel electrodes 190a and 190b are spaced apart from each other by the cutouts 93a and 93b and a cutout connection 99 connecting the cutouts 93a and 93b.

Each of the lower and the upper cutouts 93a-95b obliquely extends approximately from a left edge, a left corner, a lower edge, or an upper edge of the pixel electrode 190 approximately to a right edge of the pixel electrode 190. The lower cutouts 93a-95a and the upper cutouts 93b-95b are disposed at lower and upper halves of the pixel electrode 190, respectively, which can be divided by the storage electrode line 131. The lower and the upper cutouts 93a-95b make an angle of about 45 degrees to the gate lines 121, and they extend substantially perpendicular to each other.

Each of the center cutouts 91 and 92 includes a center portion extending in the transverse direction and a pair of oblique portions substantially parallel to the lower cutouts 93a-95a and the upper cutout 93b-95b, respectively. The center cutout 92 is connected to the cutout connection 99.

Accordingly, the lower half of the pixel electrode 190 is partitioned into six lower partitions by the lower cutouts 91-95a, and the upper half of the pixel electrode 190 is also partitioned into six upper partitions by the upper cutouts 91-95b. The number of partitions or the number of the cutouts is varied depending on the design factors such as the size of the pixel electrode 190, the ratio of the transverse edges and the longitudinal edges of the pixel electrode 190, the type and characteristics of the liquid crystal layer 3, and so on.

The pixel electrodes 190 overlap adjacent gate lines 121 or adjacent data lines 171a and 171b to increase aperture ratio.

The contact assistants 81, 82a and 82b are connected to the end portions 129 of the gate lines 121 and the end portions 179a and 179b of the data lines 171a and 171b through the contact holes 181, 182a and 182b, respectively.

The shielding electrode includes a plurality of transverse portions extending along the gate lines 121 and a plurality of longitudinal portions extending along the data lines 171a and 171b. The longitudinal portion fully cover the data lines 171a and 171b, while the transverse portions are narrower than the gate lines 121 to expose upper and lower edges of the gate lines 121. Two adjacent data lines 171b and 171a are fully covered with a transverse portion of the shielding electrode 88. However, the coverage given by the shielding electrodes may be changed.

The description of the common electrode panel 200 follows with reference to FIGS. 28 and 30B.

A light blocking member is formed on an insulating substrate 210 such as transparent glass or plastic. The light blocking member 220 includes a plurality of rectilinear portions facing the data lines 171 on the TFT array panel 100 and a plurality of widened portions facing the TFTs Qa and Qb on the TFT array panel 100. Otherwise, the light blocking member 220 may have a plurality of openings that face the pixel electrodes 190 and it may have substantially the same planar shape as the pixel electrodes 190.

A plurality of color filters 230 are also formed on the substrate 210 and an overcoat 250 is formed on the color filters 230 and the light blocking member 220.

A common electrode 270 is formed on the overcoat 250. The common electrode 270 has a plurality of sets of cutouts 71-76b.

A set of cutouts 71-76b face a pixel electrode 190 and include center cutouts 71, 72 and 73, lower cutouts 74a, 75a and 76a and upper cutouts 74b, 75b and 76b. Each of the cutouts 71-76b is disposed between adjacent cutouts 91-95b of the pixel electrode 190 or between a cutout 95a or 95b and a chamfered edge of the pixel electrode 190. In addition, each of the cutouts 71-76b has at least an oblique portion having a depressed notch and extending parallel to the lower cutout 93a-95a or the upper cutout 93b-95b of the pixel electrode 190.

Each of the lower and the upper cutouts 74a-76b includes an oblique portion and a pair of transverse and longitudinal portions or a pair of longitudinal portions. The oblique portion extends approximately from a left edge, a left corner, a lower edge, or an upper edge of the pixel electrode 190 approximately to a right edge of the pixel electrode 190. The transverse and longitudinal portions extend from respective ends of the oblique portion along edges of the pixel electrode 190, overlapping the edges of the pixel electrode 190, and making obtuse angles with the oblique portion.

Each of the center cutouts 71-73 includes a central transverse portion, a pair of oblique portions, and a pair of terminal longitudinal portions. The central transverse portion extends approximately from a center or the right edge of the pixel electrode 190 along the storage electrode line 131. The oblique portions extend from an end of the central transverse portion approximately to the left edge of the pixel electrode and making oblique angles with the central transverse portion. The terminal longitudinal portions extend from the ends of the respective oblique portions along the left edge of the pixel electrode 190, overlapping the left edge of the pixel electrode 190, and making obtuse angles with the respective oblique portions.

The number of the cutouts 71-76b may be varied depending on the design factors, and the light blocking member 220 may also overlap the cutouts 71-76b to block the light leakage through the cutouts 71-76b.

In the meantime, since there is no electric field between the shielding electrode 88 and the common electrode 270, the LC molecules on the shielding electrode 88 remain their initial orientations and thus the light incident thereon is blocked. Accordingly, the shielding electrode 88 may serve as a light blocking member.

The shapes and the arrangements of the cutouts 71-76b and 91-95b may be modified.

At least one of the cutouts 71-72b and 91-92b can be substituted with protrusions (not shown) or depressions (not shown). The protrusions are preferably made of organic or inorganic material and disposed on or under the field generating electrodes 191 or 270.

Alignment layers 11 and 21 that may be homeotropic or homogeneous are coated on inner surfaces of the panels 100 and 200.

Polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

It is preferable that the LC layer 3 has negative dielectric anisotropy and it is subjected to a vertical alignment that the LC molecules in the LC layer 3 are aligned such that their long axes are substantially vertical to the surfaces of the panels 100 and 200 in absence of electric field.

In this way, the TFT array panel according to this embodiment includes a pair of TFTs Qa and Qb coupled to two subpixel electrodes 190a and 190b that form a single pixel electrode 190, and a pair of data lines 171a and 171b respectively coupled to the TFTs Qa and Qb. Therefore, the two subpixels PXa and PXb receive different data signals.

A LC panel assembly according to another embodiment of the present invention will be described in detail with reference to FIGS. 31 and 32b.

Figure 31:
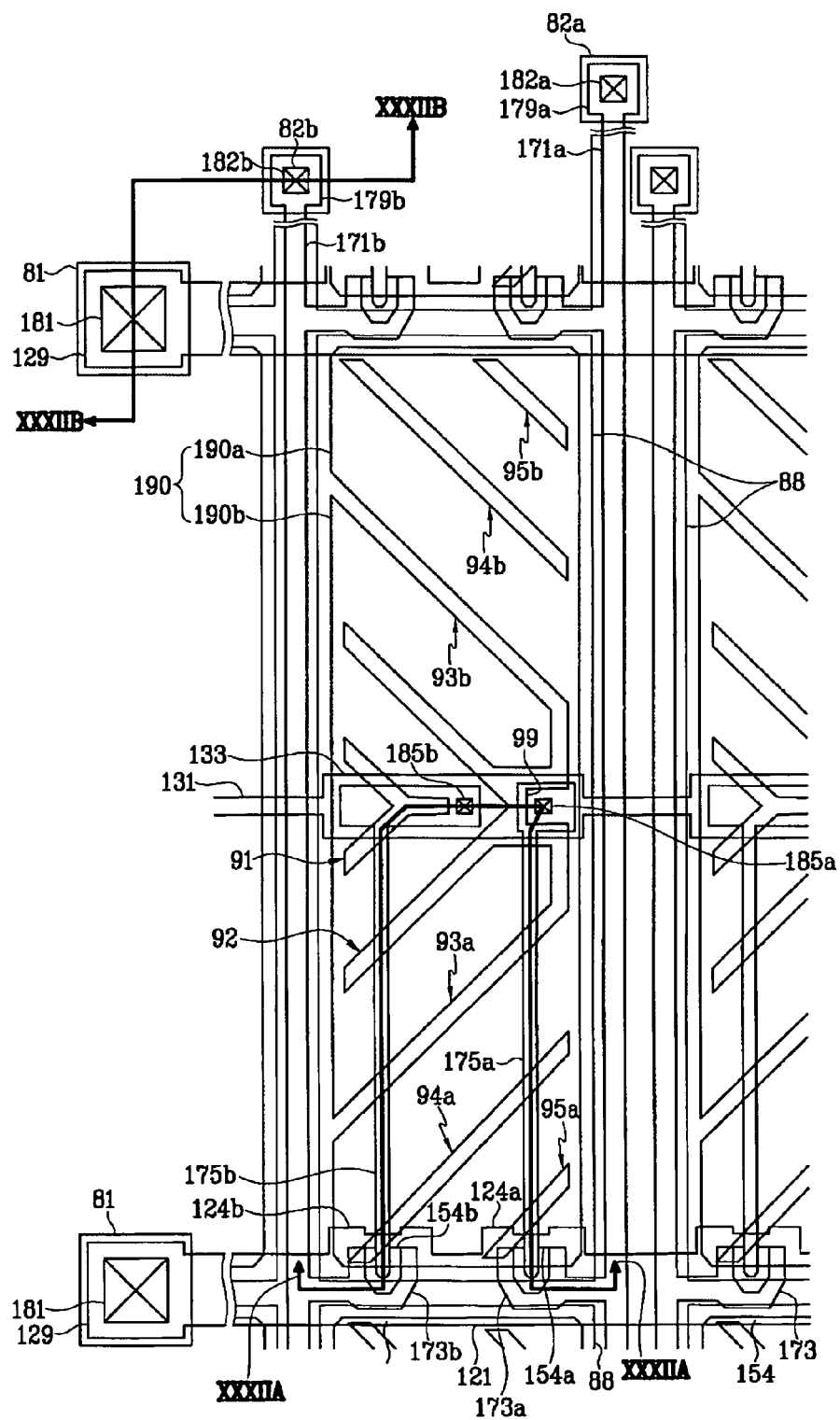
FIG. 31 is a layout view of a TFT array panel according to another embodiment of the present invention.
Figure 32A:
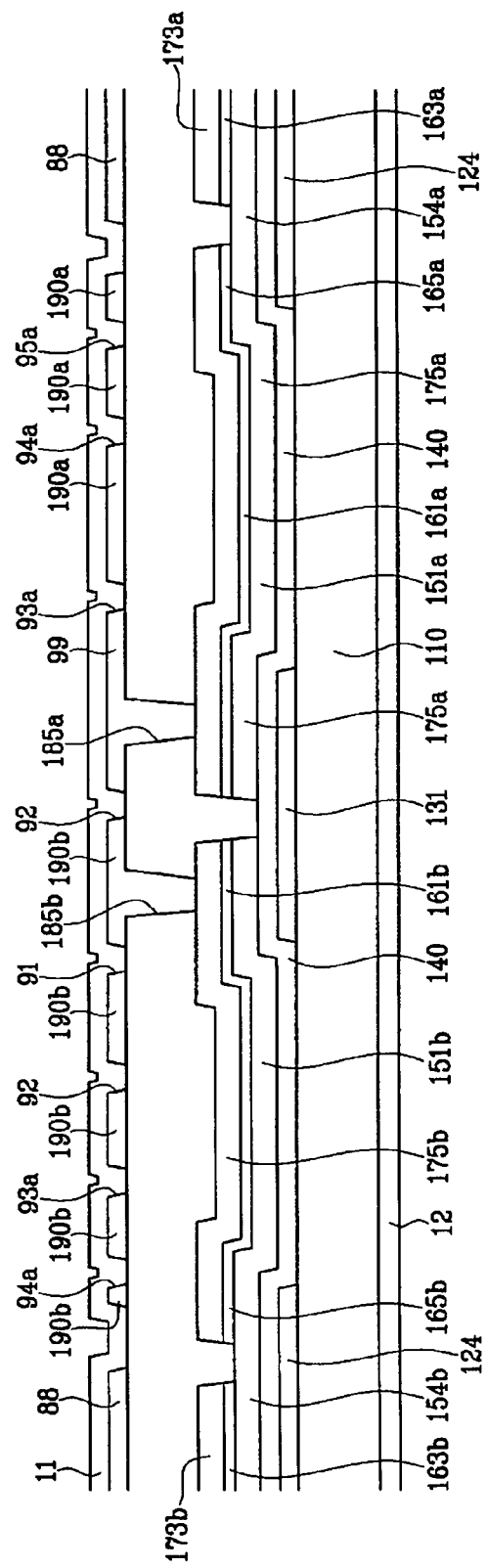
FIG. 32A is a sectional view of the TFT array panel shown in FIG. 31 taken along line XXXIIA-XXXIIA.
Figure 32B:
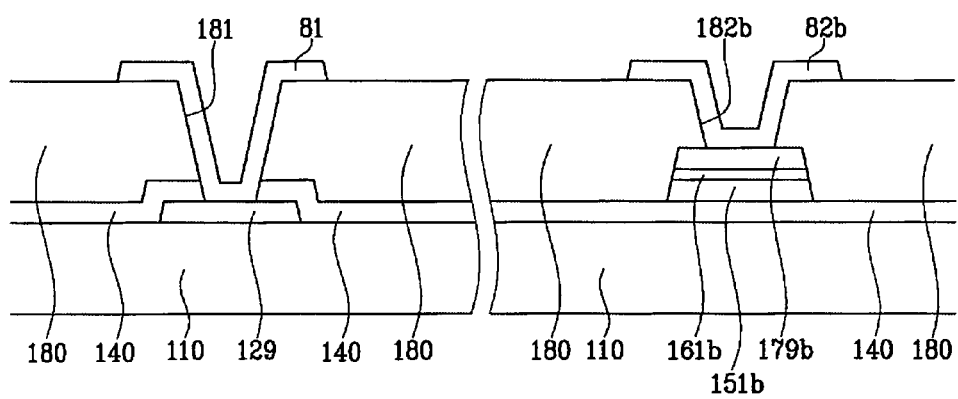
FIG. 32B is a sectional view of the TFT array panel shown in FIG. 31 taken along line XXXIIB-XXXIIB.

FIG. 31 is a layout view of a TFT array panel according to another embodiment of the present invention, FIG. 32A is a sectional view of the TFT array panel shown in FIG. 31 taken along line XXXIIA-XXXIIA, and FIG. 32B is a sectional view of the TFT array panel shown in FIG. 31 taken along line XXXIIB-XXXIIB.

Referring to FIGS. 31 and 32b, a layered structures of the TFT array panel 100 according to this embodiment are almost the same as that shown in FIGS. 29-30B.

That is, a plurality of gate lines 121 including gate electrodes 124 and end portions 129 and a plurality of storage electrode lines 131 including storage electrodes 133 are formed on a substrate 110. A gate insulating layer 140, a plurality of semiconductor stripes 151a and 151b including projections 154a and 154b, and a plurality of ohmic contact stripes 161 including projections 163a and 163b and ohmic contact islands 165a and 165b are sequentially formed on the gate lines 121 and the storage electrode lines 131. A plurality of data lines 171a and 171b including source electrodes 173a and 173b and end portions 179a and 179b and a plurality of drain electrodes 175a and 175b are formed on the ohmic contacts 161a, 161b, 165a and 165b. A passivation layer 180 is formed on the data lines 171a and 171b, the drain electrodes 175a and 175b, the gate insulating layer 140, and exposed portions of the semiconductor stripes 151a and 151b. A plurality of contact holes 181, 182a, 182b, 185a and 185b are provided at the passivation layer 180 and the gate insulating layer 140. A plurality of subpixel electrodes 190 including subpixel electrodes 190a and 190b and having cutouts 91-95b, a shielding electrode 88, and a plurality of contact assistants 81, 82a and 82b are formed on the passivation layer 180, and an alignment layer 11 is coated thereon.

Different from the TFT array panel shown in FIGS. 29-30B, the semiconductor stripes 151a and 151b have almost the same planar shapes as the data lines 171a and 171b and the drain electrodes 175a and 175b as well as the underlying ohmic contacts 161a, 161b, 165a and 165b. However, the semiconductors 151a and 151b include some exposed portions, which are not covered with the data lines 171a and 171b and the drain electrodes 175a and 175b, such as portions located between the source electrodes 173a and 173b and the drain electrodes 175a and 175b.

A manufacturing method of the TFT array panel according to an embodiment simultaneously forms the data lines 171a and 171b, the drain electrodes 175a and 175b, the semiconductors 151a and 171b, and the ohmic contacts 161a, 161b, 165a and 165b using one photolithography step.

A photoresist masking pattern for the photolithography process has position-dependent thickness, and in particular, it has thicker portions and thinner portions. The thicker portions are located on wire areas that will be occupied by the data lines 171a and 171b and the drain electrodes 175a and 175b, and the thinner portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

In this LCD, the signal controller 600 outputs image data DAT for both subpixels PXa and PXb of a pixel row, and the data driver 590 simultaneously applies the image data to both the subpixels PXa and PXb through the pairs of data lines.

Therefore, the gate driver 490 and the data driver 590 has an operation period equal to one horizontal period.

Now, the inversion of the LCD according to an embodiment of the present invention will be described with reference to FIG. 33 as well as FIG. 25.

Figure 33:
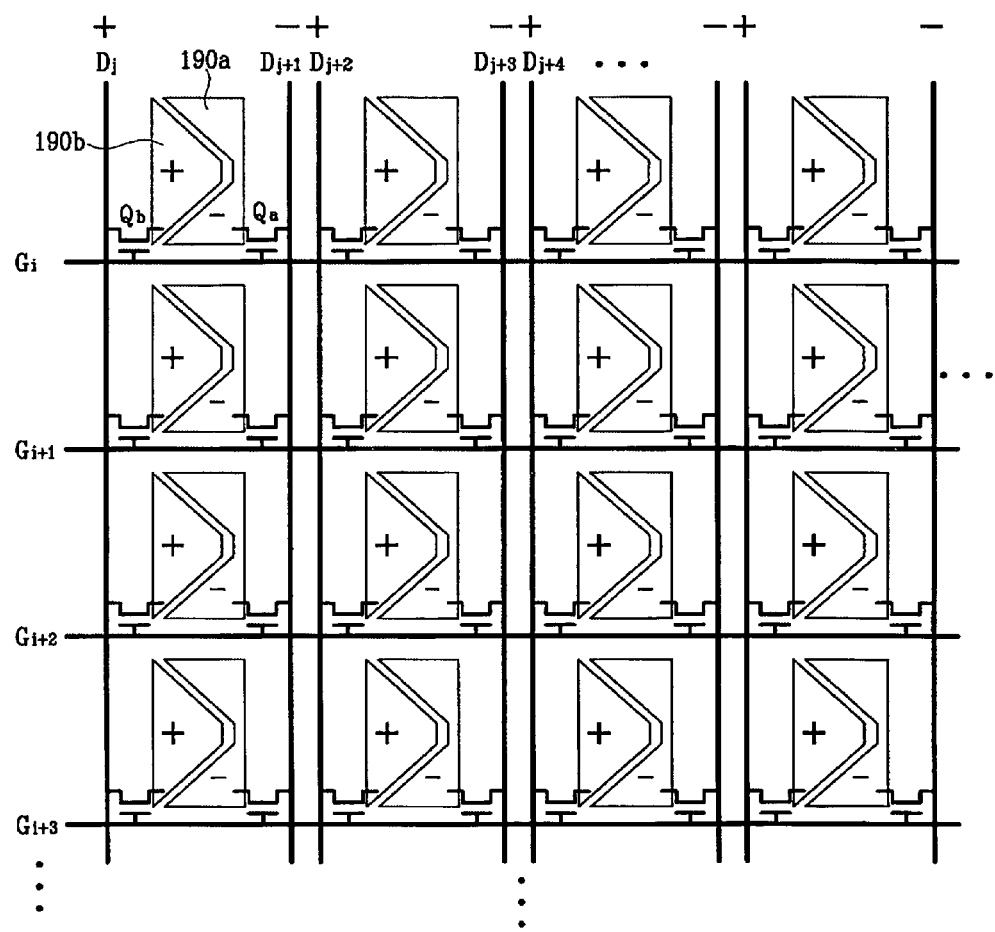
FIG. 33 shows polarity of the pixel electrodes in a column inversion according to an embodiment of the present invention.

FIG. 33 shows polarity of the pixel electrodes in a column inversion according to an embodiment of the present invention.

Referring to FIG. 33, the data driver 590 performs a column inversion such that the data voltages applied to a data line have the same polarity during a frame and the data voltages applied to two adjacent data lines have opposite polarities.

Therefore, first and second subpixel electrodes 190a and 190b of a pixel electrode 190 have opposite polarities, while the first subpixel electrodes 190a of the pixel electrodes 190 have the same polarity, and the second subpixel electrodes 190b of the pixel electrodes 190 have the same polarity. For example, the subpixel electrodes 190a have a positive polarity (+) for a frame, while the subpixel electrodes 190b have a negative polarity (−) for the frame.

Accordingly, although the data driver 590 performs a column inversion, there is no vertical stripe defect since a pixel electrode 190 has both positive and negative polarities. In addition, the pixels representing the same color have the same polarity state, and thus the degradation of image quality due to the polarity difference between the same-colored pixels is reduced. Furthermore, the polarity of the data voltages in a data line is reversed by frame, the response time of liquid crystal and the signal delay at the data lines are improved as compared with a case that the polarity is reversed by row.

In this way, the voltages of two subpixels are exactly controlled to improve the visibility, the aperture ratio, and the transmittance.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A display device comprising:
    a pixel including a first subpixel and a second subpixel;
    a first signal line connected to the first subpixel and transmitting a first signal;
    a second signal line connected to the second subpixel and transmitting a second signal;
    a third signal line intersecting the first and the second signal lines, connected to at least one of the first and the second subpixels, and transmitting a third signal;
    a fourth signal line intersecting the first and the second signal lines and transmitting a fourth signal;
    a gray signal generating circuit which generates a first gray signal group and a second gray signal group that are different from each other;
    a selection circuit which alternately selects one from the first gray signal group and the second gray signal group and outputs the selected gray signal group to a data driver; and
    the data driver which generates a first data voltage corresponding to an image data for the pixel based on the first gray signal group when the first gray signal is selected at the selection circuit, or generates a second data voltage corresponding to the image data for the pixel based on the second gray signal group when the second gray signal is selected at the selection circuit, and then applies the first data voltage and the second data voltage alternately to the third signal line,
    wherein the first subpixel is supplied with the first data voltage, and the second subpixel is supplied with the second data voltage,
    wherein the first data voltage has a same polarity as the second data voltage,
    wherein the first data voltage corresponds to the image data based on the first gray signal group,
    wherein the second data voltage corresponds to the image data based on the second gray signal group.

2. The display device of claim 1, wherein the first subpixel comprises a first switching element connected to the first signal line and a first liquid crystal capacitor connected to the first switching element, and
    the second subpixel comprises a second switching element connected to the second signal line and a second liquid crystal capacitor connected to the second switching element.

3. The display device of claim 2, wherein the first liquid crystal capacitor comprises a first subpixel electrode connected to the first switching element, and
    the second liquid crystal capacitor comprises a second subpixel electrode connected to the second switching element.

4. The display device of claim 3, wherein the first and the second subpixel electrodes are spaced from each other by a gap making oblique angles with the first to the fourth signal lines.

5. The display device of claim 3, wherein at least one of the first and the second subpixel electrodes has a cutout making oblique angles with the first to the fourth signal lines.

6. The display device of claim 3, wherein the first and the second subpixel further comprises a common electrode having a cutout making oblique angles with the first to the fourth signal lines.

7. The display device of claim 2, wherein the first switching element is connected to the first and the third signal lines, and the second switching element is connected to the second and the third signal lines.

8. The display device of claim 7, wherein the first switching element is turned on according to the first signal and transmits the third signal, and the second switching element is turned on according to the second signal and transmits the third signal.

9. The display device of claim 7, wherein the first switching element is turned on according to the third signal and transmits the first signal, and the second switching element is turned on according to the third signal and transmits the second signal.

10. The display device of claim 2, wherein the first subpixel is connected to the first and the third signal lines and the second subpixel is connected to the second and the fourth signal.

11. The display device of claim 2, wherein the first subpixel further comprises a first storage capacitor connected to the first switching element, and the second subpixel further comprises a second storage capacitor connected to the second switching element.

12. The display device of claim 1, wherein the first subpixel and the second subpixel are capacitively coupled to each other.

13. A display device comprising:
a plurality of pixels arranged in a matrix, each pixel including a first subpixel and a second subpixel;
a plurality of first gate lines connected to the first subpixels and transmitting first gate-on voltages;
a plurality of second gate lines connected to the second subpixels and transmitting second gate-on voltages;
a plurality of data lines intersecting the first and the second gate lines, connected to the first and the second subpixels, and transmitting data voltages;
a gray signal generating circuit generating a first gray signal group and a second gray signal group that are different from each other, wherein each of the first gray signal group and the second gray signal group comprises gray voltages having positive polarity with respect to a common voltage and gray voltages having negative polarity with respect to the common voltage;
a selection circuit alternately selecting one from the first and the second gray signal groups and outputting the selected gray signal group to a data driver;
the data driver generating the data voltage corresponding to image data based on the selected gray signal groups and alternately applying the data voltage based on the signal group and the data voltage on the second gray signal groups to a data line of the plurality of data lines; and
a gate driver sequentially applying the first and the second gate-on voltages to the first and the second gate lines.

14. The display device of claim 13, wherein the gray voltages of the first gray signal group and the second gray signal group include analog gray voltages.

15. The display device of claim 14, wherein the selection circuit comprises an analog switch.

16. The display device of claim 14, wherein the selection circuit comprises an analog multiplexer.

17. The display device of claim 14, wherein the selection circuit is integrated into the data driver.

18. The display device of claim 14, wherein the gray signal generating circuit comprises a plurality of analog voltage generation circuits, each analog voltage generation circuit including a series of resistors.

19. The display device of claim 13, wherein the gray signals comprises digital gray data.

20. The display device of claim 19, further comprising a digital-to-analog voltage converter converting the digital gray data in the gray signal groups selected by the selection circuit to generate a plurality of gray voltages.

21. The display device of claim 20, wherein the selection circuit comprises a plurality of multiplexers connected to the gray signal generating circuit.

22. The display device of claim 13, wherein the application of the first gate-on voltage and the application of the second gate-on voltage overlap each other at least in part.

23. The display device of claim 22, wherein a duration of the first gate-on voltage is equal to a duration of the second gate-on voltage.

24. The display device of claim 22, wherein a duration of the first gate-on voltage is shorter than a duration of the second gate-on voltage.

25. A liquid crystal display comprising:
first and second gate lines extending in a first direction and being separated from each other;
a data line intersecting the first and the second gate lines;
a first thin film transistor connected to the first gate line and the data line;
a second thin film transistor connected to the second gate line and the data line;
a first display electrode connected to the first thin film transistor;
a second display electrode connected to the second thin film transistor;
a gray signal generating circuit which generates a first gray signal group and a second gray signal group that are different from each other;
a selection circuit which alternately selects one from the first gray signal group and the second gray signal group and outputs the selected signal group to a data driver; and
the data driver which generates a first data voltage corresponding to an image data for a pixel based on the first gray signal group when the first gray signal is selected at the selection circuit, or generates a second data voltage corresponding to the image data for the pixel based on the second gray signal group the when second gray signal is selected at the selection circuit, and then applies the first data voltage and the second data voltage alternately to the data line;
wherein the first display electrode is supplied with the first data voltage and the second display electrode is supplied with the second data voltage
wherein the first data voltage has a same polarity as the second data voltage,
wherein the first data voltage corresponds to the image data based on the first gray signal group,
wherein the second data voltage corresponds to the image data based on the second gray signal group, and
wherein the first and the second display electrodes have oblique edges facing each other.

26. A liquid crystal display comprising:
first and second gate lines extending in a first direction and separated from each other;
a data line intersecting the first and the second gate lines;
a first thin film transistor connected to the first gate line and the data line;
a second thin film transistor connected to the second gate line and the data line;
a first display electrode connected to the first thin film transistor;
a second display electrode connected to the second thin film transistor;
a gray signal generating circuit which generates a first gray signal group and a second gray signal group that are different from each other;
a selection circuit which alternately selects one from the first gray signal group and the second gray signal group and outputs the selected gray signal group to a data driver;
the data driver which generates a first data voltage corresponding to an image data for a pixel based on the first gray signal group when the first gray signal is selected at the selection circuit, or generates a second data voltage corresponding to the image data for the pixel based on the second gray signal group when the second gray signal is selected at the selection circuit, and then applies the first data voltage and the second data voltage alternately to the data line, wherein the first display electrode is supplied with the first data voltage and the second display electrode is supplied with the second data voltage, wherein the first data voltage has a same polarity as the second data voltage, wherein the first data voltage corresponds to the image data based on the first gray signal group, wherein the second data voltage corresponds to the image data based on the second gray signal group, and wherein the first display electrode is longer than the second display electrode in a second direction, and the first display electrode is disposed within a second-directional length of the second display electrode.

27. A liquid crystal display comprising:
first and second gate lines extending in a first direction and separated from each other;
a data line intersecting the first and the second gate lines;
a first thin film transistor connected to the first gate line and the data line;
a second thin film transistor connected to the second gate line and the data line;
a first display electrode connected to the first thin film transistor;
a second display electrode connected to the second thin film transistor;
a gray signal generating circuit which generates a first gray signal group and a second gray signal group that are different from each other;
a selection circuit which alternately selects one from the first gray signal group and the second gray signal group and outputs the selected gray signal group to a data driver;
the data driver which generates a first data voltage which correspond to an image data for a pixel based on the first gray signal group when the first gray signal is selected at the selection circuit, or generates a second data voltage corresponding to the image data for the pixel based on the second gray signal group when the second gray signal is selected at the selection circuit, and then applies the first data voltage and the second data voltage alternately to the data line, wherein the first display electrode is supplied with the first data voltage and the second display electrode is supplied with the second data voltage, wherein the first data voltage has a same polarity as the second data voltage, wherein the first data voltage corresponds to the image data based on the first gray signal group, wherein the second data voltage corresponds to the image data based on the second gray signal group, and wherein each of the first and the second display electrodes has a symmetry with respect to a straight line extending in the first direction.

28. The liquid crystal display of claim 27, further comprising a third display electrode facing the first and the second display electrodes.

29. The liquid crystal display of claim 28, wherein at least one of the first and the second display electrodes has a cutout.

30. The liquid crystal display of claim 29, wherein the third display electrode has a cutout or protrusion.

31. The liquid crystal display of claim 28, wherein at least one of the first and the second display electrodes and the third display electrode have alternately arranged cutouts.

32. The liquid crystal display of claim 31, wherein a gap between the first and the second display electrodes and a cutout of the third display electrode are alternately arranged.

33. The liquid crystal display of claim 27, further comprising a storage electrode line overlapping the first and the second display electrodes.

34. The liquid crystal display of claim 33, wherein each of the first and the second thin film transistors has a gate electrode connected to the first or the second gate line, a source electrode connected to the data line, and a drain electrode connected to the first or the second display electrode.

35. The liquid crystal display of claim 27, wherein the first data voltage is smaller than the second data voltage by a predetermined voltage.

36. The liquid crystal display of claim 27, further comprising a shielding electrode overlapping the data line and disposed on a same layer as the first and the second display electrodes.

* * * * *